United States Patent
Takeda et al.

(10) Patent No.: US 11,805,451 B2
(45) Date of Patent: Oct. 31, 2023

(54) FAST SCELL ACTIVATION

(71) Applicant: QUALCOMM Incorporated, San Diego, CA (US)

(72) Inventors: Kazuki Takeda, Tokyo (JP); Changhwan Park, San Diego, CA (US); Olufunmilola Omolade Awoniyi-Oteri, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/546,941

(22) Filed: Dec. 9, 2021

(65) Prior Publication Data

US 2022/0225183 A1    Jul. 14, 2022

Related U.S. Application Data

(60) Provisional application No. 63/135,472, filed on Jan. 8, 2021.

(51) Int. Cl.
*H04L 5/00* (2006.01)
*H04W 36/00* (2009.01)
*H04W 48/08* (2009.01)

(52) U.S. Cl.
CPC ....... *H04W 36/0061* (2013.01); *H04L 5/0055* (2013.01); *H04W 36/0069* (2018.08); *H04W 48/08* (2013.01)

(58) Field of Classification Search
CPC ......... H04W 36/0061; H04W 36/0069; H04W 48/08; H04W 24/10; H04W 48/12; H04L 5/0055; H04L 1/1854; H04L 1/1671; H04L 5/0048; H04L 5/0098
See application file for complete search history.

(56) References Cited

U.S. PATENT DOCUMENTS

| | | | |
|---|---|---|---|
| 2019/0356444 A1* | 11/2019 | Noh | H04W 80/02 |
| 2020/0177336 A1* | 6/2020 | Li | H04L 5/001 |
| 2021/0409975 A1* | 12/2021 | Hsieh | H04W 76/15 |
| 2022/0022067 A1* | 1/2022 | Kim | H04L 5/0048 |
| 2022/0086676 A1* | 3/2022 | Al | H04W 72/542 |
| 2022/0271899 A1* | 8/2022 | Hsieh | H04L 5/0098 |

OTHER PUBLICATIONS

International Search Report and Written Opinion—PCT/US2021/062945—ISA/EPO—dated Mar. 22, 2022.

(Continued)

*Primary Examiner* — Hashim S Bhatti
(74) *Attorney, Agent, or Firm* — Procopio, Cory, Hargreaves & Savitch LLP/Qualcomm Incorporated

(57) ABSTRACT

A UE may receive, from a serving cell, an activation indication for an SCell, receiving a first reference signal from the SCell, the first reference signal including at least one temporary reference signal, identify whether a second reference signal is received after processing the activation indication and before an expiration of an SCell activation time, and activate, upon identifying that the second reference signal is received, the SCell based on one or more reference signals including at least one of the first reference signal or the second reference signal. The UE may activate the SCell no later than in slot n+K, and K may be determined based on at least in part the SCell activation time.

34 Claims, 15 Drawing Sheets

(56) References Cited

OTHER PUBLICATIONS

Mediatek Inc: "Efficient and Low Latency SCell Data Transmission for NR CA", 3GPP Draft, 3GPP TSG RAN WG1 Meeting RAN1 #98-Bis, R1-1911436_Efficient and Low Latency SCell Data Transmission for NR CA_RevFinal, 3GPP, vol. RAN WG1, No. Chongqing, China, Oct. 14, 2019-Oct. 20, 2019 (Oct. 22, 2019), XP051798702, 19 Pages, Retrieved from Internet: URL: https://ftp.3gpp.org/tsg_ran/WG1_RL1/TSGR1_98b/Docs/R1-1911436.zip R1-1911436_ Efficient and Low Latency SCell Data Transmission for NR CA_RevFinal.docx [retrieved Oct. 22, 2019] Item 1, p. 8, Figures 1, 3-8.

Qualcomm Incorporated: "Fast SCell Activation and SCell Dormancy", 3GPP TSG-RAN WG1 #98bis, 3GPP Draft, R1-1911139, Fast SCell Activation and SCell Dormancy, 3GPP, vol. RAN WG1, No. Chongqing, China, Oct. 14, 2019-Oct. 20, 2019, Oct. 5, 2019 (Oct. 5, 2019), XP051808862, 18 pages, Retrieved from the Internet: URL: https://ftp.3gpp.org/tsg_ran/WG1_RL1/TSGR1_98b/Docs/R1-1911139.zip, R1-1911139 Fast SCell activation and SCell dormancy. docx [retrieved on Oct. 5, 2019] pp. 1, 5, pp. 9-12, p. 1-p. 17.

Samsung: "On Efficient Activation/Deactivation Mechanism for SCells", 3GPP Draft, 3GPP TSG RAN WG1 #102-e, R1-2008197, 3GPP, vol. RAN WG1, No. e-Meeting, Oct. 26, 2020-Nov. 13, 2020 Oct. 24, 2020 (Oct. 24, 2020), XP051946582, 4 Pages, Retrieved from the Internet: URL: https://ftp.3gpp.org/tsg_ran/WG1_RL1/TSGR1_103-e/Docs/R1-2008197.zip R1-2008197 Fast SCell Activation-Deactivation.docx [retrieved on Oct. 24, 2020] Section 2, p. First-p. Fourth Figure 1.

\* cited by examiner

FAST SCELL ACTIVATION

CROSS REFERENCE TO RELATED APPLICATION(S)

This application claims the benefit of and priority to U.S. Provisional Application Ser. No. 63/135,472, entitled "METHOD AND APPARATUS FOR FAST SCELL ACTIVATION" and filed on Jan. 8, 2021, which is expressly incorporated by reference herein in its entirety.

TECHNICAL FIELD

The present disclosure relates generally to communication systems, and more particularly, to a method of wireless communication including a fast secondary cell (SCell) activation using temporary reference signal (RS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be user equipment (UE) may receive, from a serving cell, an activation indication for a SCell, receiving a first reference signal from the SCell, the first reference signal including at least one temporary reference signal, identify whether a second reference signal is received after processing the activation indication and before an expiration of an SCell activation time, and activate, upon identifying that the second reference signal is received, the SCell based on one or more reference signals including at least one of the first reference signal or the second reference signal. The UE may activate the SCell no later than in slot n+K, and K may be determined based on at least in part the SCell activation time.

The UE may transmit, to the serving cell, an acknowledgment (ACK) of receiving the activation indication, where the activation indication is processed within a first time duration after the ACK is transmitted to the serving cell. The UE may transmit a channel state information (CSI) report of one of the first reference signal or the second reference signal on which the UE based the activation of the SCell.

The UE may activate the SCell no later than in slot n+K, and K may be determined based on at least in part the SCell activation time. In one aspect, the activation indication may be received via one of a medium access control (MAC) control element (CE) (MAC-CE) or downlink control information (DCI), and the at least one temporary reference signal includes an aperiodic tracking reference signal, and the activation indication indicates the aperiodic tracking reference signal transmitted by the SCell. The SCell activation time may be the SCell activation time between transmission of the ACK of the activation indication and a second time duration after receiving the at least one temporary reference signal.

In another aspect, the activation indication may be received via radio resource control (RRC) signaling, and the at least one temporary reference signal includes a periodic tracking reference signal, and the activation indication indicates the periodic tracking reference signal transmitted by the SCell. The SCell activation time may be the SCell activation time between transmission of the ACK of the activation indication and a second time duration after receiving a last of one or more reference signals on which the UE based the activation of the SCell. The activation indication may indicate activating multiple SCells simultaneously, and the multiple SCells may be in the same frequency band, in contiguous carriers in the same frequency band, or in a frequency range.

The UE may receive, from a serving cell, an activation indication for the SCell based on a first reference signal, the activation indication indicating a transmission of the first reference signal for activating the SCell, identify whether the first reference signal is transmitted as indicated, and activating, upon identifying that the first reference signal is transmitted as indicated, the SCell based on one or more reference signals including the first reference signal or a second reference signal. The UE may transmit, to the serving cell, the ACK of receiving the activation indication, where the activation indication is processed within a first time duration after the ACK is transmitted to the serving cell.

The first reference signal may include at least one of a periodic tracking reference signal or an aperiodic tracking reference signal. The UE may identify whether the first reference signal is transmitted as indicated by performing a clear channel assessment to determine whether a channel measurement is greater than a threshold value, and identifying that the first reference signal is not transmitted as indicated by the activation indication in response to determining that the channel measurement is greater than the threshold value.

The UE may receive, from the serving cell, an instruction to cancel the transmission of the first reference signal where the UE identifies that the first reference signal is not transmitted in response to receiving the instruction to cancel the transmitted first reference signal, and where the instruction to cancel the activation indication for the SCell based on the first reference signal is indicated by one of a MAC-CE or DCI.

The UE may receive, upon identifying that the first reference signal is not transmitted as indicated, a second reference signal from the SCell, and activate, upon identifying that the first reference signal is not transmitted as indicated, the SCell based on the second reference signal received from the SCell. The SCell activation time may be the SCell activation time between transmission of the ACK of the activation indication and a second time duration after receiving the second reference signal.

The UE may receive a new activation indication indicating a transmission of a second reference signal for activating the SCell, where, upon receiving the new activation indication, the UE identifies that the first reference signal is not transmitted as indicated.

The activation indication may indicate activating multiple SCells simultaneously, and the multiple SCells may be in the same frequency band, in contiguous carriers in the same frequency band, or in a frequency range.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
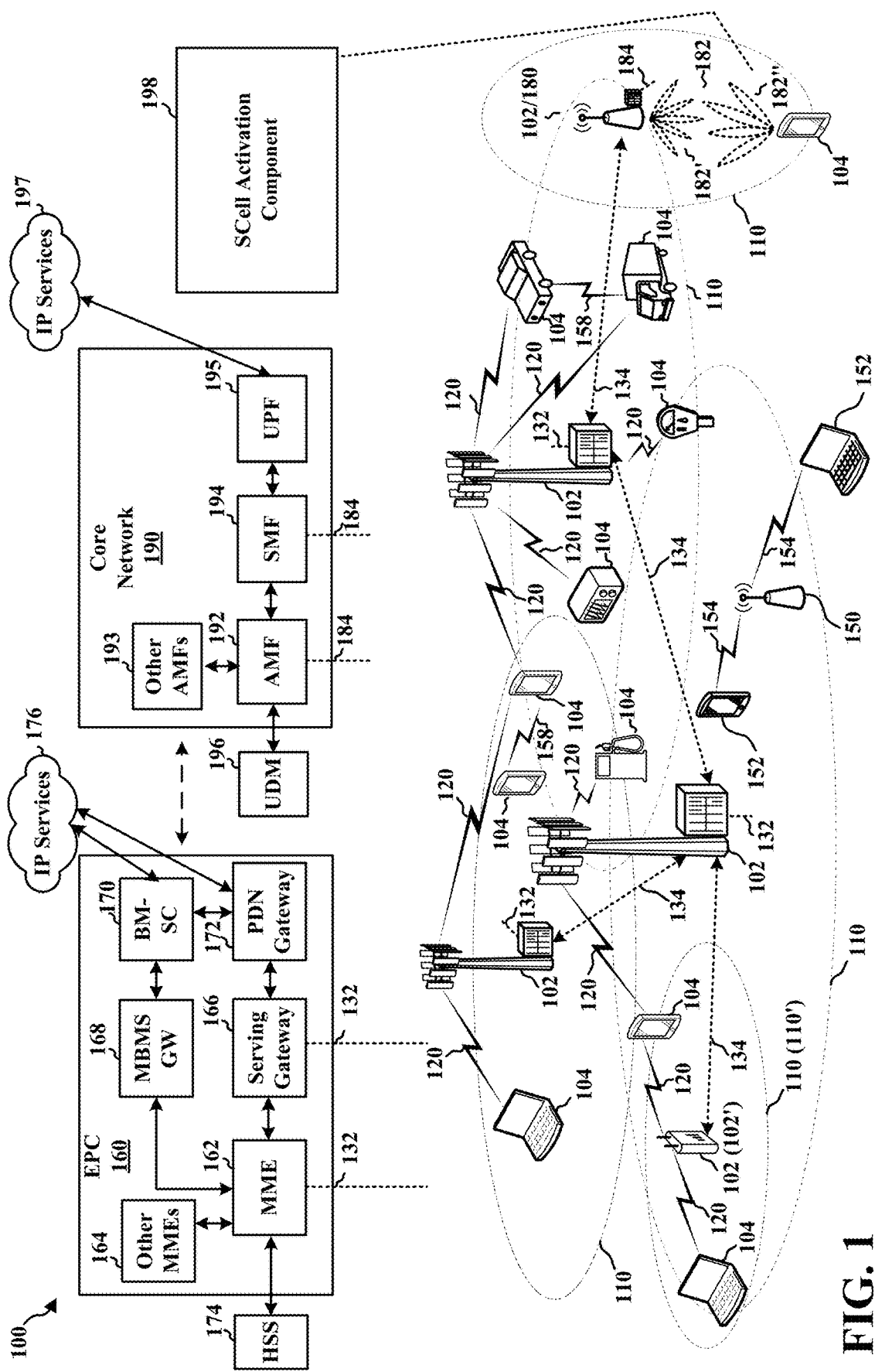
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media.

Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an SCell activation component 198 configured to receive, from a serving cell, an activation indication for an SCell, receive a first reference signal from the SCell, the first reference signal including at least one temporary reference signal, identify whether a second reference signal is received after processing the activation indication and before an expiration of an SCell activation time, and activate, upon identifying that the second reference signal is received, the SCell based on one or more reference signals including at least one of the first reference signal or the second reference signal. Although the following description may be focused on 5G NR, the concepts described herein may be applicable to other similar areas, such as LTE, LTE-A, CDMA, GSM, and other wireless technologies.

Figure 2:
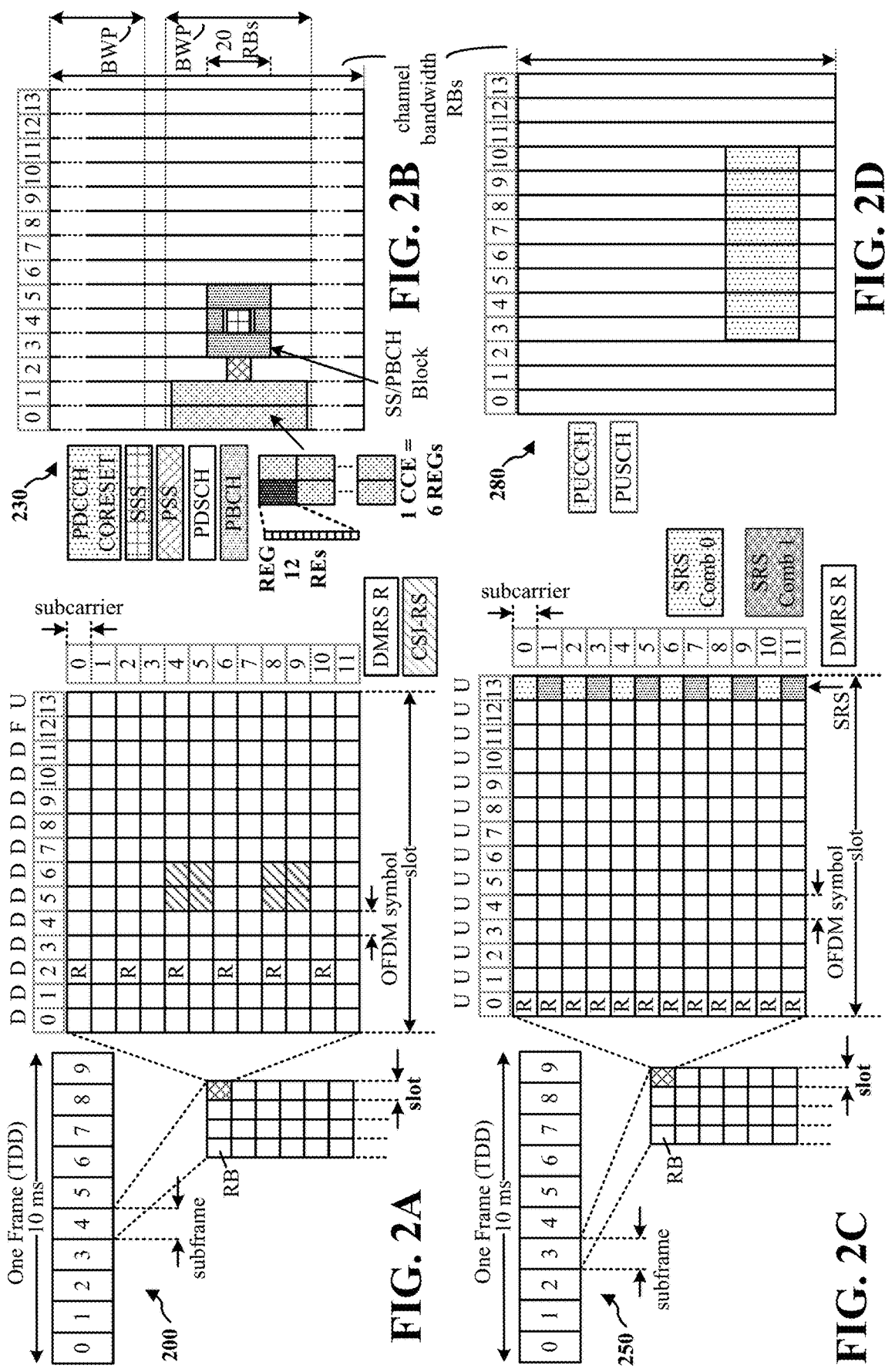
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot$ 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
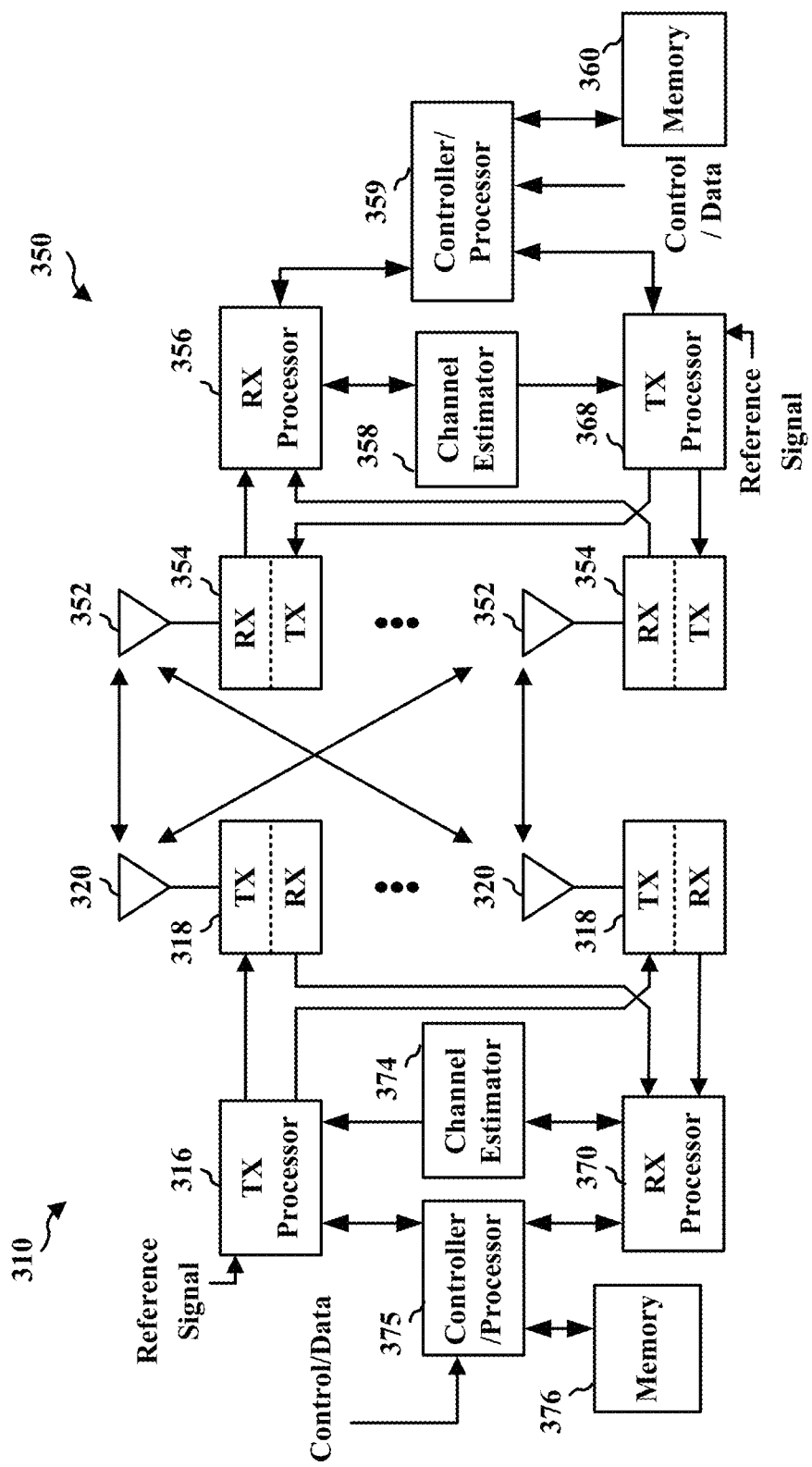
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In some aspects of wireless communication, one or more active serving cells may instruct a UE to activate a deactivated SCell for carrier aggregation. The one or more active serving cells may include the PCell or another active serving SCell connected to the UE. The UE may receive an SCell activation command or indication from the one or more active serving cells, and upon receiving the SCell activation indication, the UE may receive a synchronization signal block (SSB) from the deactivated SCell, and activate the deactivated SCell. To activate the deactivated SCell, the UE may perform at least one procedure including an SSB detection, a fine time/frequency tracking, or an automatic gain control (AGC) setting to activate the SCell.

Upon receiving an SCell activation indication in a slot n, the UE may transmit a valid CSI report and apply actions related to the activation indication for the SCell being activated no later than in slot $$n + \frac{T_{HARQ} + T_{activation\_time} + T_{CSI\_Reporting}}{NR\ slot\ length},$$

where $T_{HARQ}$ in milliseconds (ms) is a time period between DL data transmission of the SCell activation indication and transmitting an acknowledgment (ACK) of the activation indication, $T_{activation\_time}$ is the SCell activation delay in ms, and $T_{CSI\_reporting}$ is a delay uncertainty in acquiring one or more first available CSI reporting resources. For example, the ACK may be a hybrid automatic repeat request (HARQ) ACK 424.

In some aspects, the $T_{activation\_time}$ may be determined based on the slot in which the SSB is received from the SCell and the at least one procedure that the UE performs to activate the SCell. In one aspect when the SCell is known to the UE and the SCell measurement cycle is less than or equal to 160 ms, the UE may perform the fine time/frequency tracking to activate the SCell. That is, if the SCell is known to the UE and the SCell measurement cycle is less than or equal to 160 ms, the UE may use one (1) SSB to perform the fine time/frequency tracking to activate the SCell. Accordingly, the $T_{activation\_time}$ may be $T_{FirstSSB}+T_{FirstDelay}+T_{SecondDelay}$, where $T_{FirstDelay}$ may be the processing time of the received SCell activation indication after transmitting the ACK of the activation indication, $T_{FirstSSB}$ may be the time between processing the activation indication and transmission of the first complete SSB burst, and $T_{SecondDelay}$ may be the processing time of the received first complete SSB burst after the transmission of the first complete SSB burst. For example, the $T_{FirstDelay}$ may be 3 ms and the $T_{SecondDelay}$ may be 2 ms. In such a case, the $T_{activation\_time}$ may be $T_{FirstSSB}+5$ ms, and the $T_{FirstSSB}$ may be the time to the end of the first complete SSB burst after slot $$n + \frac{T_{HARQ} + 3\ ms}{NR\ slot\ length}.$$

In one aspect when the SCell is known to the UE and the SCell measurement cycle is greater than 160 ms, the UE may perform the fine time/frequency tracking and the AGC setting to activate the SCell. That is, if the SCell is known to the UE and the SCell measurement cycle is greater than 160 ms, the UE may use two (2) SSBs to perform the fine time/frequency tracking and the AGC setting to activate the SCell. Accordingly, the $T_{activation\_time}$ may be $T_{FirstSSB\_MAX}+T_{rs}+T_{FirstDelay}+T_{SecondDelay}$, where $T_{FirstDelay}$ is the processing time of the received SCell activation indication after transmitting the ACK of the activation indication, $T_{FirstSSB\_MAX}$ is the time between processing the activation indication and transmission of the first complete SSB burst, $T_{rs}$ is a SSB based RRM measurement timing configuration (SMTC) periodicity or a measurement object periodicity or the SSB frequency, and $T_{SecondDelay}$ is the processing time of the received first complete SSB burst after the transmission of the first complete SSB burst. For example, the $T_{FirstDelay}$ may be 3 ms and the $T_{SecondDelay}$ may be 2 ms. In such a case, the $T_{activation\_time}$ may be $T_{FirstSSB\_MAX}+T_{rs}+5$ ms and the $T_{FirstSSB\_MAX}$ may be the time to the end of the first complete SSB burst after slot $$n + \frac{T_{HARQ} + 3 \text{ ms}}{NR \text{ slot length}}.$$

In one aspect when the SCell is unknown to the UE the UE may perform the fine time/frequency tracking, the AGC setting, and the SSB detection to activate the SCell. That is, if the SCell is unknown to the UE, the UE may use four (4) SSBs to perform the fine time/frequency tracking, the AGC setting, and the SSB detection to activate the SCell. Accordingly, the $T_{activation\_time}$ may be $T_{FirstSSB\_MAX}+T_{SMTC\_MAX}+2T_{rs}+T_{FirstDelay}+T_{SecondDelay}$, where $T_{FirstDelay}$ is the processing time of the received SCell activation indication after transmitting the ACK of the activation indication, $T_{FirstSSB\_MAX}$ is the time between processing the activation indication and transmission of the first complete SSB burst, $T_{rs}$ is the SMTC periodicity or the measurement object periodicity or the SSB frequency, the $T_{SMTC\_MAX}$ is the longer SMTC periodicity between active serving cells and SCell being activated, and $T_{SecondDelay}$ is the processing time of the received first complete SSB burst after the transmission of the first complete SSB burst. For example, the $T_{FirstDelay}$ may be 3 ms and the $T_{SecondDelay}$ may be 2 ms. In such a case, the $T_{activation\_time}$ may be $T_{firstSSB\_MAX}+T_{SMTC\_MAX}+2T_{rs}+5$ ms and the $T_{firstSSB\_MAX}$ may be the time to the end of the first complete SSB burst after slot $$n + \frac{T_{HARQ} + 3 \text{ ms}}{NR \text{ slot length}}.$$

In some aspects, one or more temporary RS may be provided to expedite the SCell activation process. Particularly, the PCell may configure the one or more temporary RS for the SCell and the UE, and the SCell may transmit the temporary RS to the UE. The UE may reduce a latency in activating an SCell for carrier aggregation by activating the SCell based on the one or more temporary RS and therefore, expedite the SCell activation procedure for efficient SCell activation for both FR1 and FR2. The UE may perform an AGC setting and time/frequency tracking during the SCell activation procedure based on the temporary RS received from the SCell. The UE may measure the temporary RS received from the SCell and generate and transmit a CSI report. The UE may also perform a cell search for the SCell based on the received temporary RS. That is, the UE may reduce the $T_{activation\_Time}$ by activating the SCell based at least in part on the one or more temporary RS.

The temporary RS may include one or more aperiodic tracking RS and/or periodic tracking RS including, but not limited to, aperiodic CSI-RS, periodic/semi-persistent CSI-RS, SRS and RS based on the PSS or the SSS. The aperiodic tracking RS may be triggered by DCI or a MAC-CE, and the periodic tracking RS may be triggered by an RRC signal. The aspects of the present disclosure may be applicable to FR1 and may be extended to FR2.

Figure 4:
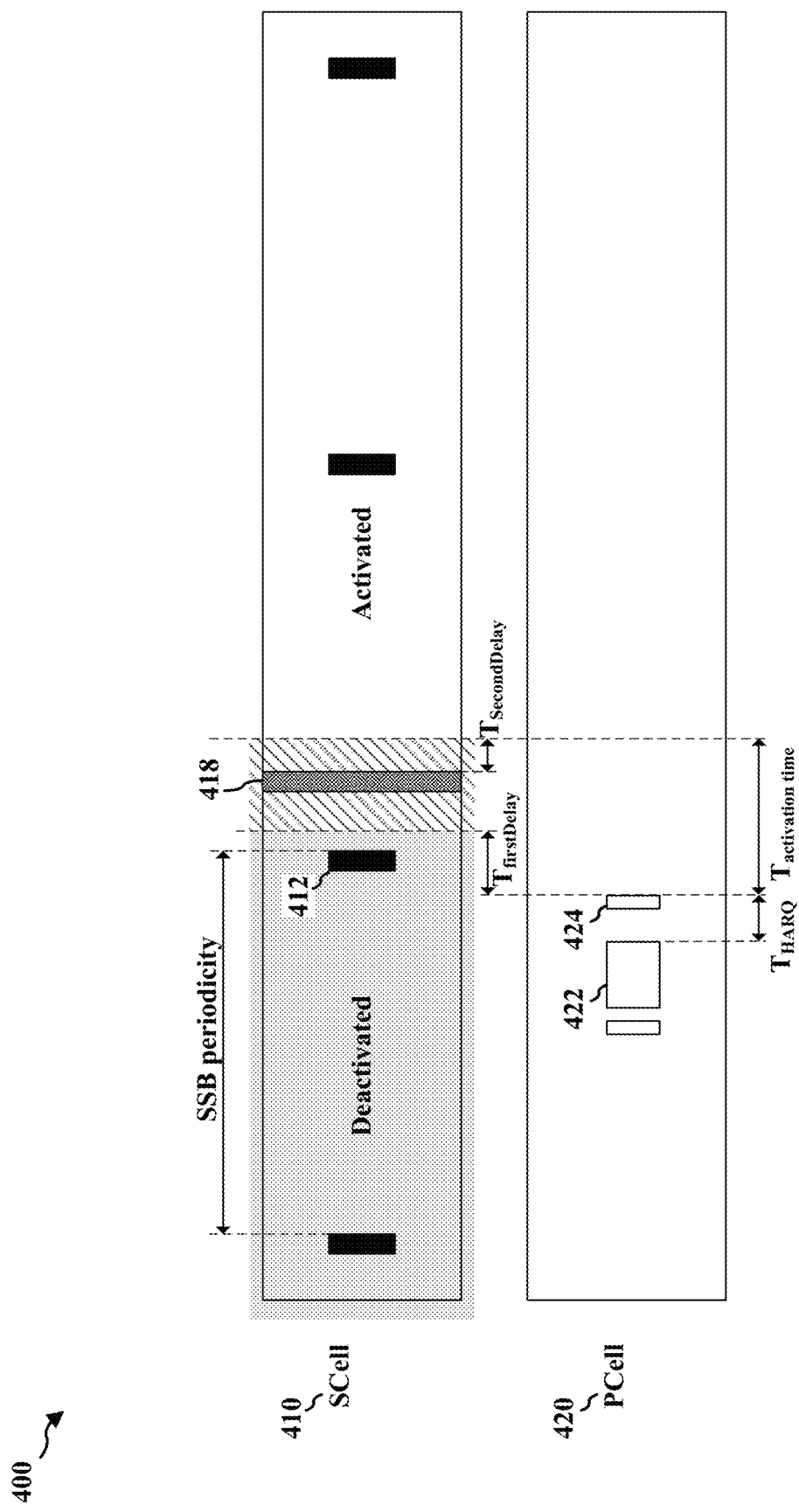
FIG. 4 illustrates an example of SCell activation of wireless communication.

FIG. 4 illustrates an example of SCell activation 400 of wireless communication. The example of SCell activation 400 includes an SCell 410 and a PCell 420. Here, the PCell 420 is the one or more active serving cells from which the UE and the SCell 410 may receive an SCell activation indication 422. The SCell may transmit the SSBs 412 at an SSB periodicity, and the SCell may transmit the temporary RS 418 based on the SCell activation indication 422 received from the PCell 420. FIG. 4 illustrates that the temporary RS 418 is an aperiodic tracking RS, but the aspects of the disclosure are not limited thereto, and the temporary RS 418 may be a periodic tracking RS.

The UE may receive the SCell activation indication 422 from the PCell 420 instructing the UE to activate the deactivated SCell 410 based on the temporary RS 418 received from the SCell 410. Upon receiving the SCell activation indication 422, the UE may transmit an ACK and process the received SCell activation indication 422. For example, the ACK may be a HARQ ACK 424 transmitted in response to the received SCell activation indication. The UE may receive the temporary RS 418 from the SCell 410, and activate the SCell 410 based on the temporary RS 418. To activate the SCell 410, the UE may perform at least one procedure including an SSB detection, a fine time/frequency tracking, or an AGC setting to activate the SCell based on the temporary RS 418 received from the PCell 420.

Upon receiving SCell activation indication 422 in a slot n, the UE may transmit valid CSI report and apply actions related to the activation indication 422 for the SCell being activated no later than in slot $$n + \frac{T_{HARQ} + T_{activation\_time} + T_{CSI\_Reporting}}{NR \text{ slot length}},$$

where $T_{HARQ}$ in milliseconds (ms) is a time period between DL data transmission of the SCell activation indication 422 and transmitting the HARQ ACK 424 of the activation indication, $T_{activation\_time}$ is the SCell activation delay in ms, and $T_{CSI\_reporting}$ is a delay uncertainty in acquiring one or more first available CSI reporting resources.

In some aspects, the $T_{activation\_time}$ may be determined based on the slot that the temporary RS is received from the SCell 410 and the at least one procedure that the UE performs to activate the SCell 410. In one aspect when the SCell 410 is known to the UE and the SCell measurement cycle is less than or equal to 160 ms, the UE may perform the fine time/frequency tracking to activate the SCell 410. That is, if the SCell 410 is known to the UE and the SCell measurement cycle is less than or equal to 160 ms, the UE may use one (1) RS including the temporary RS to perform the fine time/frequency tracking to activate the SCell 410. Accordingly, the $T_{activation\_time}$ may be $T_{Temp\_RS}+T_{firstDelay}+T_{SecondDelay}$, where $T_{FirstDelay}$ is the processing time of the received SCell activation indication 422 after transmitting the HARQ ACK 424 of the SCell activation indication 422, and $T_{SecondDelay}$ is the processing time of the received first temporary RS 418 after the transmission of the first temporary RS 418. The $T_{temp\_RS}$ may be the time between processing the activation indication and transmission of the first temporary RS 418, between $T_{firstDelay}$ after transmission of the HARQ ACK 424 and transmission of the first temporary RS 418. For example, the $T_{FirstDelay}$ may be 3 ms and the $T_{SecondDelay}$ may be 2 ms. In such case, the $T_{activation\_time}$ may be $T_{Temp\_RS}+5$ ms, and the $T_{Temp\_RS}$ may be the time to the end of the first complete RS burst after slot $$n + \frac{T_{HARQ} + 3 \text{ ms}}{NR \text{ slot length}}.$$

FIG. 4 illustrates that the first temporary RS 418 may meet the $T_{activation\_time}$, and the UE may activate the SCell 410 based on the first temporary RS 418. However, aspects of the disclosure are not limited thereto, and the UE may use any RS that may meet the $T_{activation\_time}$. The SCell activation indication may be transmitted via a MAC-CE, DCI, or an RRC signal. That is, the RRC-based direct SCell activation at SCell addition/handover/RRC-resume may be possible. Furthermore, on a to-be-activated SCell, the SSB and/or the periodic tracking RS configured by RRC signaling may not be triggered/canceled by the MAC-CE/DCI. That is, an RRC signal may configure a periodic tracking RS for the SCell and the UE directly upon SCell addition/handover/RRC-resume, and the periodic tracking RS may not be triggered or canceled by the MAC-CE or the DCI. The MAC-CE of the DCI may also configure the aperiodic tracking RS.

The UE may use one or more RSs from a set of RSs for SCell activation in the same or different serving cell(s), whichever may meet the SCell activation delay. That is, the deactivated SCell or other SCell may transmit one or more RSs for SCell activation, and as long as the SCell activation delay may be met, the UE may use any RS of a set of RSs including all or a subset of the SSB, the periodic tracking RS, or the aperiodic tracking RS. That is, as long as the one or more RSs for SCell activation may meet the $T_{activation\_time}$, the UE may use at least one of the one or more RSs for the SCell activation.

Figure 5:
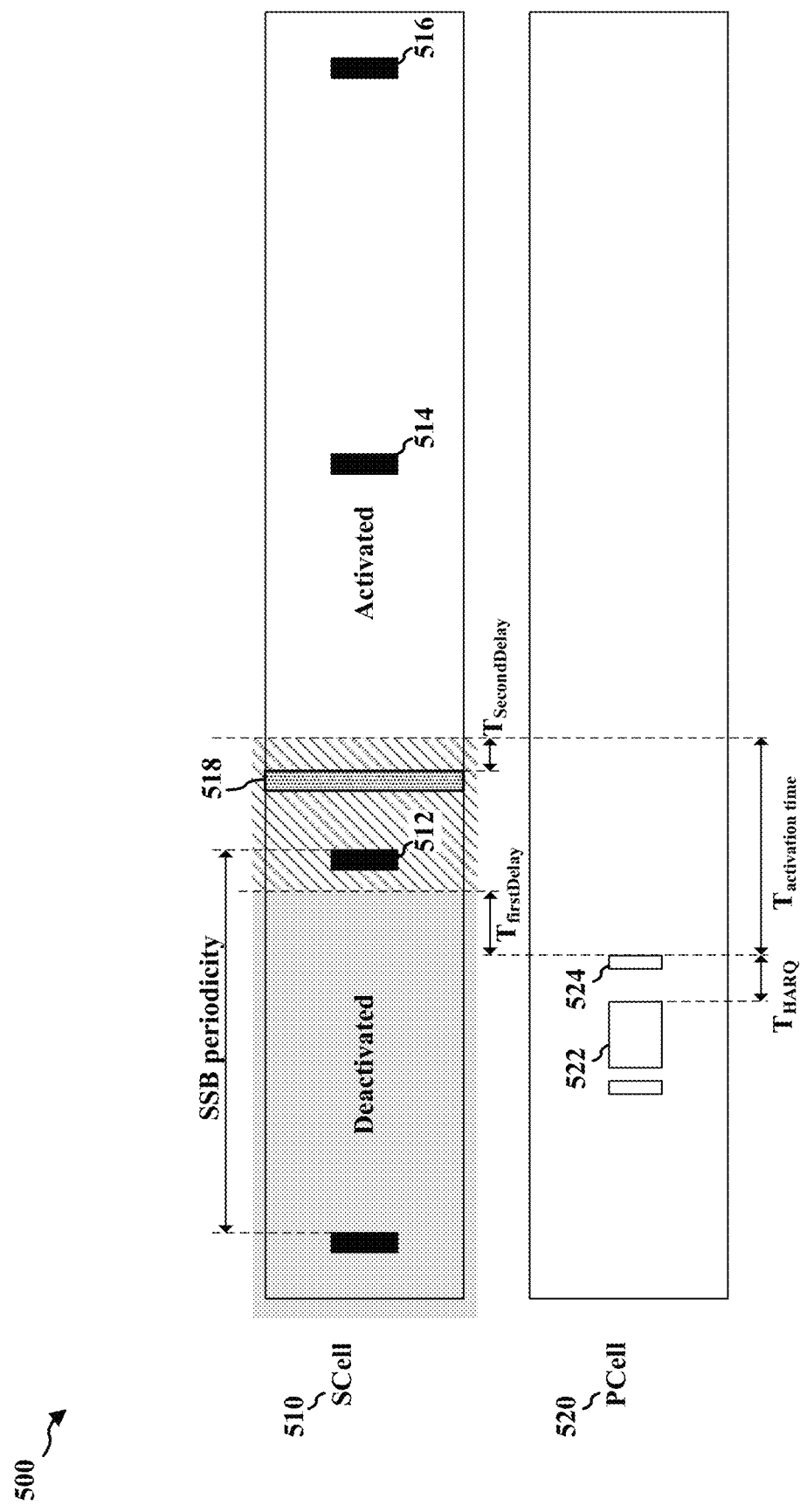
FIG. 5 illustrates an example of SCell activation of wireless communication.

FIG. 5 illustrates an example of SCell activation 500 of wireless communication. The example of SCell activation 500 includes an SCell 510 and a PCell 520. The example of SCell activation 500 of wireless communication illustrates that the SCell 510 may be activated using a first temporary RS 518, and an SSB 512 may be received between $T_{firstDelay}$ after transmission of the HARQ ACK 524 and before expiration of the $T_{activation\_time}$. The first temporary RS 518 may be an aperiodic tracking RS triggered by DCI or a MAC-CE.

Referring to FIG. 5, the SSB 512 received after 't=ACK timing+3 ms' may be usable if the UE processes the SCell activation indication 522 received via DCI or a MAC-CE is completed earlier than 't=ACK timing+3 ms.' Therefore, the UE may use the SSB 512 to activate the SCell 510. The UE may use one or more RS including the SSBs, periodic tracking RSs, and/or the indicated aperiodic tracking RS for the AGC setting, or fine time/frequency tracking for the SCell activation. That is, the window for $T_{activation\_time}$ may be determined based on the timing of the triggered first temporary RS 518, and the UE can utilize any RS including the SSB/the periodic tracking RS/the aperiodic tracking RS as long as the necessary procedure can be performed within the window.

Upon receiving SCell activation indication 522 in a slot n, the UE may transmit a valid CSI report and apply actions related to the SCell activation indication 522 for the SCell being activated no later than in slot $$n + \frac{T_{HARQ} + T_{activation\_time} + T_{CSI\_Reporting}}{NR \text{ slot length}},$$

where $T_{HARQ}$ in milliseconds (ms) is a time period between DL data transmission of the SCell activation indication 522 and transmitting the HARQ ACK 524 of the activation indication, $T_{activation\_time}$ is the SCell activation delay in ms, and $T_{CSI\_reporting}$ is a delay uncertainty in acquiring one or more first available CSI reporting resources.

In some aspects, the $T_{activation\_time}$ may be determined based on the slot in which the temporary RS is received from the SCell 510 and the at least one procedure that the UE performs to activate the SCell 510. In one aspect when the SCell 510 is known to the UE and the SCell measurement cycle is less than or equal to 160 ms, the UE may perform the fine time/frequency tracking to activate the SCell 510. That is, if the SCell 510 is known to the UE and the SCell measurement cycle is less than or equal to 160 ms, the UE may use one (1) temporary RS to perform the fine time/frequency tracking to activate the SCell 510. Accordingly, the $T_{activation\_time}$ may be $T_{Temp\_RS}+T_{FirstDelay}+T_{SecondDelay}$, where $T_{FirstDelay}$ is the processing time of the received SCell activation indication 522 after transmitting the HARQ ACK 524 of the SCell activation indication 522, and $T_{SecondDelay}$ is the processing time of the received first temporary RS 518 after the transmission of the first temporary RS 518. The $T_{temp\_RS}$ may be a time duration starting from '$T_{HARQ}+3$ ms' to the end of the last OFDM symbol or the last slot of the first temporary RS, if the first temporary RS is triggered for the SCell activation, no matter whether the UE actually uses the first temporary RS to activate the SCell. That is, the $T_{Temp\_RS}$ may be the time between processing the activation indication and transmission of the first temporary RS 518, between $T_{firstDelay}$ after transmission of the HARQ ACK 524 and transmission of the first temporary RS 518. For example, the $T_{FirstDelay}$ may be 3 ms, and the $T_{SecondDelay}$ may be 2 ms. In such a case, the $T_{activation\_time}$ may be $T_{Temp\_RS}+5$ ms, and the $T_{Temp\_RS}$ may be the time to the end of the first complete RS burst after slot $$n + \frac{T_{HARQ} + 3 \text{ ms}}{NR \text{ slot length}}.$$

For other conditions (e.g., unknown cell), the value of $T_{activation\_time}$ may be different but the principle may be the same. In one aspect when the SCell is known to the UE and the SCell measurement cycle is greater than 160 ms, the UE may perform the fine time/frequency tracking and the AGC setting to activate the SCell 510. That is, if the SCell is known to the UE and the SCell measurement cycle is greater than 160 ms, the UE may use two (2) RS including the first temporary RS 518 to perform the fine time/frequency tracking and the AGC setting to activate the SCell 510. Here, the UE may use the SSB 512 and the first temporary RS 518 as the two (2) RS including the first temporary RS 518 to activate the SCell 510. Accordingly, referring to FIG. 4, the $T_{activation\_time}$ may be reduced to $T_{Temp\_RS}+T_{FirstDelay}+T_{SecondDelay}$, where $T_{FirstDelay}$ is the processing time of the received SCell activation indication 522 after transmitting the HARQ ACK 524 of the SCell activation indication 522, and $T_{SecondDelay}$ is the processing time of the received first temporary RS 518 after the transmission of the first temporary RS 518. The $T_{Temp\_RS}$ may be the time between processing the activation indication and transmission of the first temporary RS 518, between $T_{firstDelay}$ after transmission of the HARQ ACK 524 and transmission of the first temporary RS 518. For example, the $T_{FirstDelay}$ may be 3 ms, and the $T_{SecondDelay}$ may be 2 ms. In such a case, the $T_{activation\_time}$ may be $T_{Temp\_RS}$+5 ms, and the $T_{Temp\_RS}$ may be the time to the end of the first complete RS burst after slot $$n + \frac{T_{HARQ} + 3 \text{ ms}}{NR \text{ slot length}}.$$

In one aspect when the SCell is unknown to the UE and belongs to FR1, the UE may perform the fine time/frequency tracking, the AGC setting, and the SSB detection to activate the SCell. That is, if the SCell is unknown to the UE, the UE may use four (4) RSs including the first temporary RS 518 to perform the fine time/frequency tracking, the AGC setting, and the SSB detection to activate the SCell. Here, the UE may use the SSBs 512, 514, and 516, and the first temporary RS 518. Accordingly, referring to FIG. 4, the $T_{activation\_time}$ may be reduced to $T_{FirstSSB}$+2$T_{rs}$+$T_{FirstDelay}$+ $T_{SecondDelay}$, where $T_{FirstDelay}$ is the processing time of the received SCell activation indication after transmitting the ACK of the activation indication, $T_{FirstSSB}$ is the time between processing the activation indication and transmission of the first complete SSB burst, $T_{rs}$ is the SSB frequency, and $T_{SecondDelay}$ is the processing time of the received first complete SSB burst after the transmission of the first complete SSB burst. For example, the $T_{FirstDelay}$ may be 3 ms, and the $T_{SecondDelay}$ may be 2 ms. In such a case, the $T_{activation\_time}$ may be $T_{FirstSSB}$+2$T_{rs}$+5 ms, and the $T_{FirstSSB\_MAX}$ may be the time to the end of the first complete SSB burst after slot $$n + \frac{T_{HARQ} + 3 \text{ ms}}{NR \text{ slot length}}.$$

Accordingly, by using the first temporary RS 518, the $T_{activation\_time}$ may be reduced, and the SCell 510 activation may be expedited. Furthermore, if a periodic tracking RS is configured on the carrier that can be used for AGC or fine time/frequency tracking and the periodic tracking RS falls into the time period, the periodic tracking RS may be used as one or more RS for the UE to use instead of or together with the triggered first temporary RS. Referring to FIG. 5, for example, if the first temporary RS 518 is a non-zero-power (NZP) CSI-RS (NZP-CSI-RS) with trs-Info' with l∈{4,8} for FR1, the $T_{temp\_RS}$ can be a time duration of 1 slot+9 OFDM symbols (if the duration ends at the last OFDM symbol) and can be a time duration of 2 slots (if the duration ends at the last slot).

Figure 6:
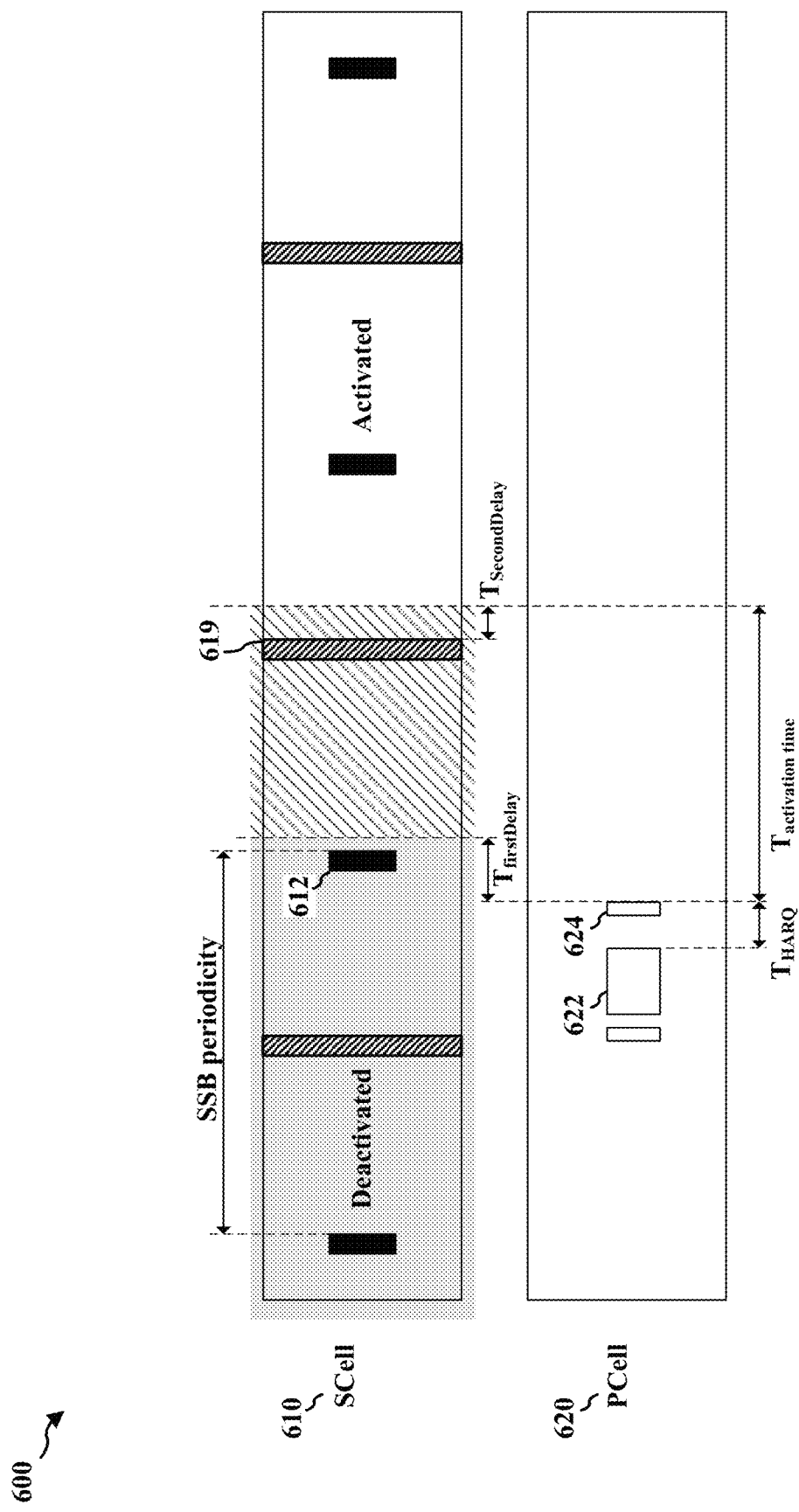
FIG. 6 illustrates an example of SCell activation of wireless communication.

FIG. 6 illustrates an example of SCell activation 600 of wireless communication. The example of SCell activation 600 includes an SCell 610 and a PCell 620. The example of SCell activation 500 of wireless communication illustrates that the SCell 610 may be activated using a second temporary RS 619 received between $T_{firstDelay}$ after transmission of the HARQ ACK 624 and before expiration of the $T_{activation\_time}$. The second temporary RS 619 may be a periodic tracking RS and may not be triggered by DCI or a MAC-CE, and the example of SCell activation 600 may be an RRC-based direct SCell activation. That is, the SCell activation indication 622 may be the RRC signal. The UE may use one or more RS including the SSBs and/or the periodic tracking RS for the AGC setting and/or the fine time/frequency tracking for the SCell activation. Here, the $T_{activation\_time}$ may be $T_{RS}$+5 ms, where $T_{RS}$ is the timing of transmission of the SSB or the periodic tracking RS, whichever may be received first for the known cell with SCell measurement cycle less than or equal to 160 ms. That is, referring to FIG. 6, if the second temporary RS 619 is received after $T_{firstDelay}$ past the transmission of the HARQ ACK 524, the $T_{activation\_time}$ may expire $T_{SecondDelay}$ after the transmission of the second temporary RS 619. If the SSB 612 is received after $T_{firstDelay}$ past the transmission of the HARQ ACK 624 prior to the second temporary RS 619, the $T_{activation\_time}$ may expire $T_{SecondDelay}$ after the transmission of the SSB 612.

For other conditions (e.g., unknown cell), the value of $T_{activation\_time}$ may be different but the principle may be the same. The window for $T_{activation\_time}$ may be determined based on the timing where the SSB or the periodic tracking RS, whichever is received first, and the UE can utilize the SSB and/or P-TRS as long as the necessary procedure can be performed within the window for $T_{activation\_time}$. Accordingly, the $T_{activation\_time}$ may be $T_{FirstDelay}$+$T_{RS}$+ $T_{SecondDelay}$, where the $T_{RS}$ is a time duration starting from '$T_{HARQ}$+3 ms' to the end of the last OFDM symbol or the last slot of the one or more RS that the UE determines to use for SCell activation.

The one or more RS may be the SSB or the periodic tracking RS, whichever is received earlier after $T_{HARQ}$+3 ms. In one aspect when the SCell 610 is known to the UE and the SCell measurement cycle is greater than 160 ms, the UE may perform the fine time/frequency tracking and the AGC setting to activate the SCell 610. That is, if the SCell is known to the UE and the SCell measurement cycle is greater than 160 ms, the UE may use two (2) RS including the SSB 612 and/or the second temporary RS 619 to perform the fine time/frequency tracking and the AGC setting to activate the SCell 610. Accordingly, the $T_{activation\_time}$ may be $T_{FirstDelay}$+$T_{RS}$+$T_{SecondDelay}$, where the $T_{RS}$ is a time duration starting from '$T_{HARQ}$+3 ms' to the end of the last OFDM symbol or the last slot of the second RS in which the UE determines to use for the SCell activation.

In one aspect when the SCell 610 is unknown to the UE and belongs to FR1, the UE may perform the fine time/frequency tracking, the AGC setting, and the SSB detection to activate the SCell. That is, if the SCell is unknown to the UE, the UE may use four (4) RSs including the second temporary RS 619 to perform the fine time/frequency tracking, the AGC setting, and the SSB detection to activate the SCell 610. Accordingly, the $T_{activation\_time}$ may be $T_{FirstDelay}$+$T_{RS}$+$T_{SecondDelay}$, where the $T_{RS}$ is a time duration starting from '$T_{HARQ}$+3 ms' to the end of the last OFDM symbol or the last slot of the fourth RS that the UE determines to use for the SCell activation.

In some aspects, referring again to FIGS. 5 and 6, multiple SCells can be activated simultaneously. The UE may activate the multiple SCells using the SSB and/or the temporary RS including the periodic tracking RS or the aperiodic tracking RS transmitted in a serving cell different from the SCell to-be-activated. For example, if there is an active serving cell in the same band as the one for the to-be-activated SCell, the temporary RSs in the active serving cell can be used for activation of the SCell. That is, in one aspect when the SCell activation indication provides a plurality of SCells to be activated simultaneously, the active serving cell may transmit the temporary RS on one of the plurality of SCells to be activated, and the UE may use the temporary RS transmitted on one of the plurality of SCells to activate the plurality of the SCells based on the SCell activation indication received from the active serving cell.

In some aspects, referring again to FIGS. 5 and 6, multiple RSs including SSBs or temporary RSs including the periodic tracking RS and/or the aperiodic tracking RSs associated with different TCI-states/QCL assumptions may be present. That is, in case of a beam-sweeping operation, multiple RSs provided on different beams may be associated with different TCI-state/QCL assumptions. Accordingly, the UE may use one or more RSs from the SSB or the temporary RS including the periodic tracking RS or the aperiodic tracking RS that are associated with the same TCI-state or QCL assumption. That is, the UE may use the one or more RSs that are transmitted on the same beams and associated with the same TCI-state/QCL assumptions. Accordingly, the UE may assume that the SSB and/or the temporary RS including the periodic tracking RS and the aperiodic tracking RS that may be used for the AGC setting and/or the fine time/frequency tracking may be quasi-co-located. The network may also configure the TCI-states of the RSs so that they are supposed to be quasi-co-located from the UE's point of view.

In some aspects, various configurations of the multiple SCells may be activated using the temporary RS. In one aspect, the to-be-activated multiple SCells may be in the same frequency band. In another aspect, the to-be-activated multiple SCells may be contiguous carriers in the same frequency band. In another aspect, the to-be-activated multiple SCells may be in FR2.

In some aspects, various configurations of the temporary RS may be used to activate the SCells. In one aspect, the UE may use the earliest received RSs of the SSB, or the temporary RS including the periodic tracking RS or the aperiodic tracking RS, received from the SCell amongst the to-be-activated multiple SCells. In another aspect, the UE may use the earliest timing that received RSs of the SSB, or the temporary RS including the periodic tracking RS or the aperiodic tracking RS transmitted over all the to-be-activated multiple SCells. In another aspect, the UE may use the latest received RSs of the SSB, or the temporary RS including the periodic tracking RS or the aperiodic tracking RS, transmitted on a SCell amongst the to-be-activated multiple SCells.

As indicated in FIGS. 5 and 6, the UE may perform procedures other than the fine time/frequency tracking to activate the one or more SCells. For example, the SCells may be unknown or the SCells may be known with the measurement cycle greater than 160 ms. The temporary RS including the periodic tracking RS and/or the aperiodic tracking RS may refer to one or more sets of temporary RS including the periodic tracking RSs and/or the aperiodic tracking RSs. Accordingly, the one or more sets of temporary RS including the periodic tracking RSs and/or the aperiodic tracking RSs received after the first SSB or SSB burst from to-be-activated SCells can be considered a valid RS, and the UE may perform at least one procedure including an SSB detection, a fine time/frequency tracking, or an automatic gain control (AGC) setting to activate the SCell based on the SSB and/or the one or more sets of temporary RS including the periodic tracking RSs and/or the aperiodic tracking RSs. The structures of the periodic/aperiodic tracking RS, including the symbol position, the number of slots, and/or the number of resource sets, may be dynamically indicated and/or determined depending on the state of to-be-activated SCell(s). For example, the SCell may be a known or unknown SCell, and the SCell measurement cycle may be less than or equal to 160 ms or greater than 160 ms, and the structures of the temporary RS including the periodic tracking RS or the aperiodic tracking RS for activating the SCell may be dynamically configured to reduce the latency in activating the SCell for carrier aggregation.

Figure 7:
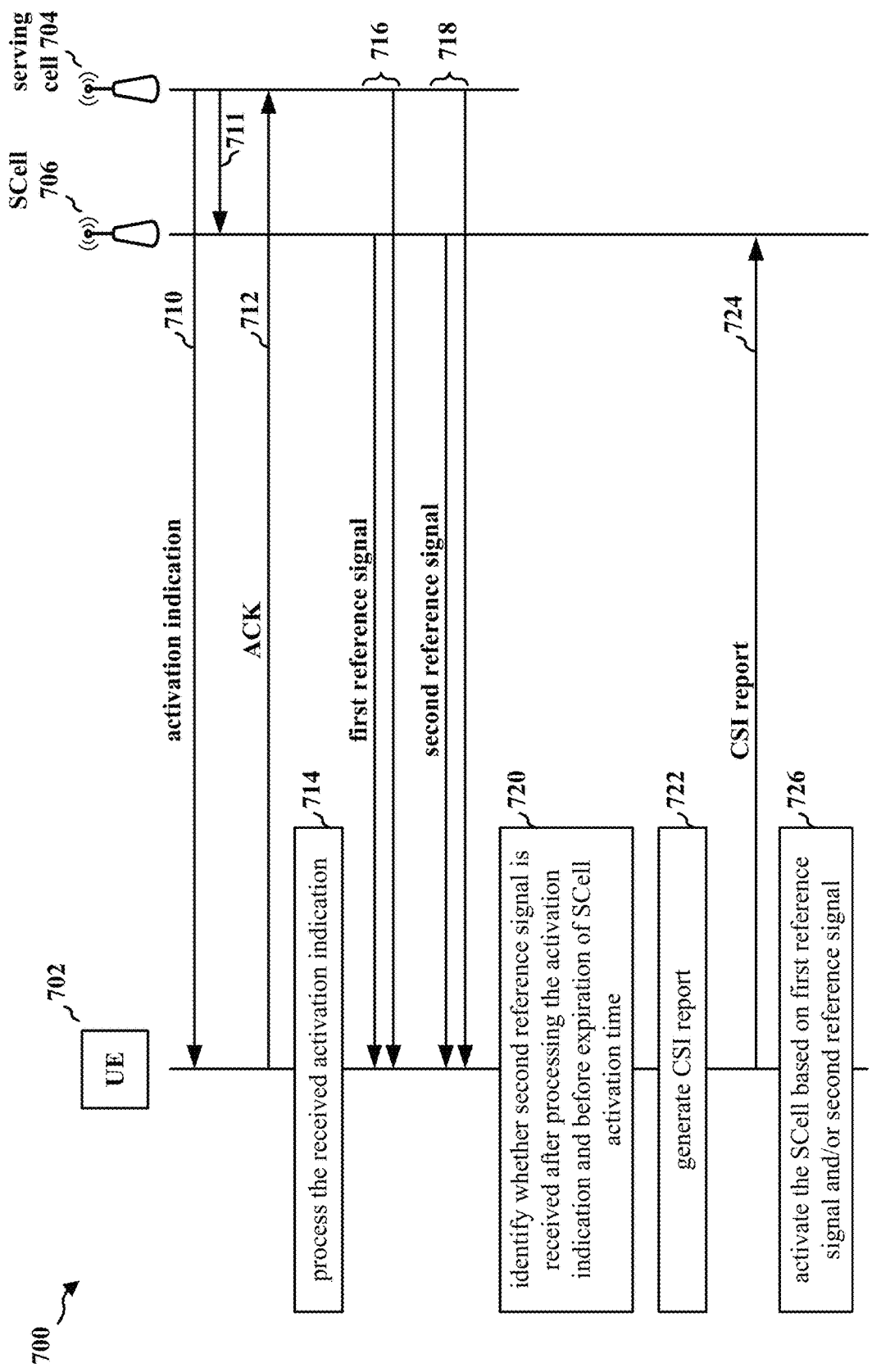
FIG. 7 illustrates a call-flow diagram of wireless communication.

FIG. 7 illustrates a call-flow diagram 700 of wireless communication. The call-flow diagram 700 may include a UE 702, a serving cell 704, and an SCell 706 to be activated by the UE 702. The UE 702 may receive an SCell activation command or indication from the one or more active serving cells, e.g., the serving cell 704. One or more temporary RSs may be provided to expedite the SCell activation procedure, and the UE 702 may expedite the SCell activation procedure using the one or more temporary RS received from the SCell 706. The UE 702 may activate the SCell 706 no later than in slot n+K, and K may be determined based on at least in part the SCell activation time.

At 710, the UE 702 may receive, from the serving cell 704, an activation indication for activating an SCell 706. The activation indication may be received via one of a MAC-CE, DCI, or an RRC signal. The activation indication may indicate activating multiple SCells 706 simultaneously, the multiple SCells 706 including a first SCell and a second SCell. The first SCell and the second SCell may be in the same frequency band, in contiguous carriers in the same frequency band, or in a frequency range. At 711, the serving cell 704 may configure the SCell 706 to transmit one or more RS, including a first reference signal and/or a second reference signal.

At 712, the UE 702 may transmit, to the serving cell 704, an ACK of receiving the activation indication, where the activation indication is processed within a first time duration after the ACK is transmitted to the serving cell 704.

At 714, the UE 702 may process the activation indication received from the serving cell 704. The UE 702 may receive the first reference signal and/or the second reference signal based on the processed activation indication.

At 716, the UE 702 may receive the first reference signal from the SCell 706, the first reference signal including at least one temporary reference signal. The first reference signal may be a temporary RS, including an aperiodic tracking RS instructed by the MAC-CE or the DCI or a periodic tracking RS instructed by the RRC signal. Here, the first reference signal may be received from the active serving cell 704.

At 718, the UE 702 may receive the second reference signal from the SCell 706, the second reference signal including at least one temporary reference signal. The second reference signal may be an SSB or a temporary RS, including an aperiodic tracking RS instructed by a MAC-CE or DCI or a periodic tracking RS instructed by the RRC signal. Here, the second reference signal may be received from the active serving cell 704. The first reference signal and the second reference signal may be assumed to be quasi-co-located with each other.

At 720, the UE 702 may identify whether a second reference signal is received after processing the activation indication and before the expiration of an SCell activation time.

At 722, the UE 702 may generate a CSI report of one of the first reference signal or the second reference signal on which the UE 702 based the activation of the SCell 706.

At 724, the UE 702 may transmit the CSI report of one of the first reference signal or the second reference signal on which the UE 702 based the activation of the SCell 706.

At 726, the UE 702 may activate the SCell 706 based on one or more reference signals, including at least one of the received first reference signal and/or second reference signal. The UE 702 may activate, upon identifying that the second reference signal is received, the SCell 706 based on one or more reference signals, including at least one of the first reference signal or the second reference signal. The UE 702 may receive the activation indication in slot n, and may activate the SCell 706 no later than in slot n+K, where K is determined based on at least one of a time period between receiving the activation indication from the serving cell and transmitting an acknowledgment (ACK) of the activation indication to the serving cell, the SCell activation time, and a delay uncertainty in acquiring one or more first available CSI reporting resources. For example, the UE 702 may receive the activation indication in slot n, and may activate the SCell 706 no later than in in slot $$n + \frac{T_{HARQ} + T_{activation\_time} + T_{CSI\_Reporting}}{\text{slot length}}.$$

The $T_{activation\_time}$ may be the SCell activation time, and be determined based on one or more reference signals, including at least one of the first reference signal or the second reference signal. In one aspect, the SCell activation time may be between transmission of the ACK of the activation indication and a second time duration after receiving the at least one temporary reference signal. In another aspect, the SCell activation time may be between transmission of the ACK of the activation indication and a second time duration after receiving a last of the one or more reference signals on which the UE based the activation of the SCell. In another aspect, the SCell activation time may be between transmission of the ACK of the activation indication and a second time duration after receiving two or four reference signals including one of the first reference signal or the second reference signal.

The UE 702 may activate multiple SCells 706 simultaneously, based on one or more reference signals including at least one temporary reference signal including the aperiodic tracking reference signal or the periodic tracking reference signal, whichever is received earliest from the multiple S Cells 706. The UE 702 may activate the multiple SCells 706 based on one or more reference signals including at least one temporary reference signal including an aperiodic tracking reference signal or a periodic tracking reference signal, whichever is received within an earliest activation time for the multiple SCells 706. The UE 702 may activate the multiple SCells 706 based on one or more reference signals including at least one temporary reference signal including an aperiodic tracking reference signal or a periodic tracking reference signal, whichever is received latest from the multiple SCells 706.

Figure 8:
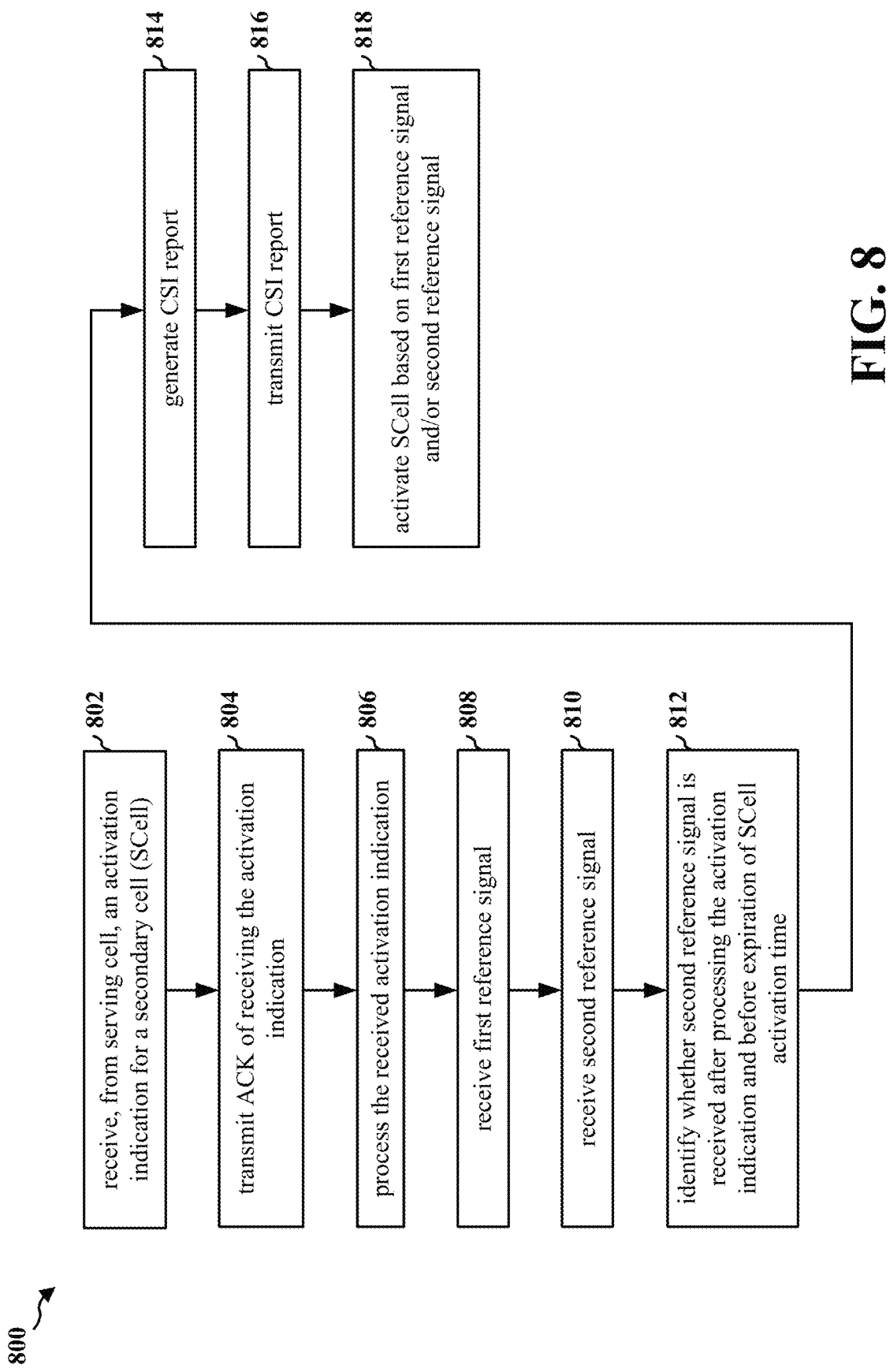
FIG. 8 is a flowchart of a method of wireless communication.

FIG. 8 is a flowchart 800 of a method of wireless communication. The method may be performed by a UE (e.g., the UE 104, 702; the apparatus 1502). The UE may receive an SCell activation command or indication from the one or more active serving cells, e.g., a serving cell. One or more temporary RS may be provided to expedite a SCell activation procedure, and the UE may expedite the SCell activation procedure using the one or more temporary RS received from the SCell. The UE may activate the SCell no later than in slot n+K, and K may be determined based on at least in part the SCell activation time.

At 802, the UE may receive, from a serving cell, an activation indication for activating an SCell. The activation indication may be received via one of a MAC-CE, DCI, or an RRC signal. The activation indication may indicate activating multiple SCells simultaneously, the multiple SCells including a first SCell and a second SCell. For example, at 710, the UE 702 may receive, from the serving cell 704, an activation indication for activating an SCell 706. Furthermore, 802 may be performed by an SCell activation component 1540.

At 804, the UE may transmit, to the serving cell, an ACK of receiving the activation indication, where the activation indication is processed within a first time duration after the ACK is transmitted to the serving cell. For example, at 712, the UE 702 may transmit, to the serving cell 704, an ACK of receiving the activation indication, where the activation indication is processed within a first time duration after the ACK is transmitted to the serving cell 704. Furthermore, 804 may be performed by an ACK component 1542.

At 806, the UE may process the activation indication received from the serving cell. The UE may receive the first reference signal and/or the second reference signal based on the processed activation indication. For example, at 714, the UE 702 may process the activation indication received from the serving cell 704. Furthermore, 806 may be performed by the SCell activation component 1540.

At 808, the UE may receive the first reference signal from the SCell, the first reference signal including at least one temporary reference signal (i.e., as at 716). The first reference signal may be a temporary RS, including an aperiodic tracking RS instructed by the MAC-CE or the DCI or a periodic tracking RS instructed by the RRC signal. Here, the first reference signal may be received from the active serving cell. For example, at 716, the UE 702 may receive the first reference signal from the SCell 706, the first reference signal including at least one temporary reference signal. Furthermore, 808 may be performed by the SCell activation component 1540.

At 810, the UE may receive the second reference signal from the SCell, the second reference signal including at least one temporary reference signal (i.e., as at 718). The second reference signal may be an SSB or a temporary RS, including an aperiodic tracking RS instructed by the MAC-CE or the DCI or a periodic tracking RS instructed by the RRC signal. Here, the second reference signal may be received from the active serving cell. The first reference signal and the second reference signal may be assumed to be quasi-co-located with each other. For example, at 718, the UE 702 may receive the second reference signal from the SCell 706, the second reference signal including at least one temporary reference signal. Furthermore, 810 may be performed by the SCell activation component 1540.

At 812, the UE may identify whether a second reference signal is received after processing the activation indication and before the expiration of an SCell activation time (i.e., as at 720). For example, at 720, the UE 702 may identify whether a second reference signal is received after processing the activation indication and before the expiration of an SCell activation time. Furthermore, 812 may be performed by the SCell activation component 1540.

At 814, the UE may generate a CSI report of one of the first reference signal or the second reference signal on which the UE based the activation of the SCell (i.e., as at 722). For example, at 722, the UE 702 may generate a CSI report of one of the first reference signal or the second reference signal on which the UE 702 based the activation of the SCell 706. Furthermore, 814 may be performed by a CSI component 1544.

At 816, the UE may transmit the CSI report of one of the first reference signal or the second reference signal on which the UE based the activation of the SCell (i.e., as at 724). For example, at 724, the UE 702 may transmit the CSI report of one of the first reference signal or the second reference signal on which the UE 702 based the activation of the SCell 706. Furthermore, 816 may be performed by the CSI component 1544.

At 818, the UE may activate the SCell based on one or more reference signals, including at least one of the received first reference signal and/or second reference signal (i.e., as at 726). The UE may activate, upon identifying that the second reference signal is received, the SCell based on one or more reference signals, including at least one of the first reference signal or the second reference signal. The UE may receive the activation indication in slot n, and may activate the SCell no later than in slot n+K, where K is determined based on at least one of a time period between receiving the activation indication from the serving cell and transmitting an acknowledgment (ACK) of the activation indication to the serving cell, the SCell activation time, and a delay uncertainty in acquiring one or more first available CSI reporting resources. For example, the UE may receive the activation indication in slot n, and may activate the SCell no later than in in slot $$n + \frac{T_{HARQ} + T_{activation\_time} + T_{CSI\_Reporting}}{\text{slot length}}.$$

The $T_{activation\_time}$ may be determined based on one or more reference signals, including at least one of the first reference signal or the second reference signal. In one aspect, the SCell activation time may be between transmission of the ACK of the activation indication and a second time duration after receiving the at least one temporary reference signal. In another aspect, the SCell activation time may be between transmission of the ACK of the activation indication and a second time duration after receiving a last of the one or more reference signals on which the UE based the activation of the SCell. In another aspect, the SCell activation time may be between transmission of the ACK of the activation indication and a second time duration after receiving two or four reference signals including one of the first reference signal or the second reference signal. The UE may activate multiple SCells simultaneously, based on one or more reference signals including at least one temporary reference signal including the aperiodic tracking reference signal or the periodic tracking reference signal, whichever is received earliest from the multiple SCells. The UE may activate the multiple SCells based on one or more reference signals including at least one temporary reference signal including an aperiodic tracking reference signal or a periodic tracking reference signal, whichever is received within an earliest activation time for the multiple SCells. The UE may activate the multiple SCells based on one or more reference signals including at least one temporary reference signal including an aperiodic tracking reference signal or a periodic tracking reference signal, whichever is received latest from the multiple SCells. For example, at 726, the UE 702 may activate the SCell 706 based on one or more reference signals, including at least one of the received first reference signal and/or second reference signal. Furthermore, 818 may be performed by the SCell activation component 1540.

Figure 9:
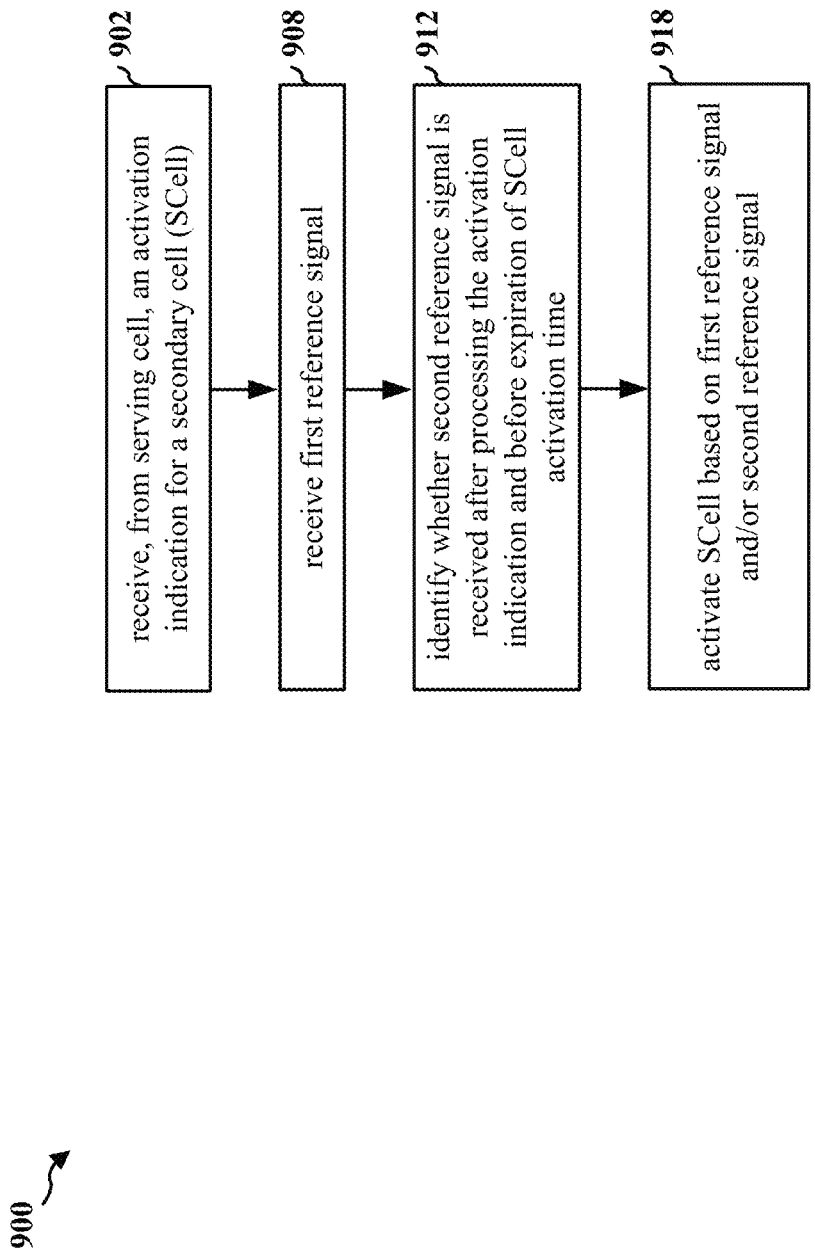
FIG. 9 is a flowchart of a method of wireless communication.

FIG. 9 is a flowchart 900 of a method of wireless communication. The method may be performed by a UE (e.g., the UE 104, 702; the apparatus 1502). The UE may receive an SCell activation command or indication from the one or more active serving cells, e.g., a serving cell. One or more temporary RS may be provided to expedite a SCell activation procedure, and the UE may expedite the SCell activation procedure using the one or more temporary RS received from the SCell. The UE may activate the SCell no later than in slot n+K, and K may be determined based on at least in part the SCell activation time.

At 902, the UE may receive, from a serving cell, an activation indication for activating an SCell. The activation indication may be received via one of a MAC-CE, DCI, or an RRC signal. The activation indication may indicate activating multiple SCells simultaneously, the multiple SCells including a first SCell and a second SCell. For example, at 710, the UE 702 may receive, from the serving cell 704, an activation indication for activating an SCell 706. Furthermore, 902 may be performed by an SCell activation component 1540.

At 908, the UE may receive the first reference signal from the SCell, the first reference signal including at least one temporary reference signal (i.e., as at 716). The first reference signal may be a temporary RS, including an aperiodic tracking RS instructed by the MAC-CE or the DCI or a periodic tracking RS instructed by the RRC signal. Here, the first reference signal may be received from the active serving cell. For example, at 716, the UE 702 may receive the first reference signal from the SCell 706, the first reference signal including at least one temporary reference signal. Furthermore, 908 may be performed by the SCell activation component 1540.

At 912, the UE may identify whether a second reference signal is received after processing the activation indication and before the expiration of an SCell activation time (i.e., as at 720). For example, at 720, the UE 702 may identify whether a second reference signal is received after processing the activation indication and before the expiration of an SCell activation time. Furthermore, 912 may be performed by the SCell activation component 1540.

At 918, the UE may activate the SCell based on one or more reference signals, including at least one of the received first reference signal and/or second reference signal (i.e., as at 726). The UE may activate, upon identifying that the second reference signal is received, the SCell based on one or more reference signals, including at least one of the first reference signal or the second reference signal. The UE may receive the activation indication in slot n, and may activate the SCell no later than in slot n+K, where K is determined based on at least one of a time period between receiving the activation indication from the serving cell and transmitting an acknowledgment (ACK) of the activation indication to the serving cell, the SCell activation time, and a delay uncertainty in acquiring one or more first available CSI reporting resources. For example, the UE may receive the activation indication in slot n, and may activate the SCell no later than in slot $$n + \frac{T_{HARQ} + T_{activation\_time} + T_{CSI\_Reporting}}{\text{slot length}}.$$

The $T_{activation\_time}$ may be determined based on one or more reference signals, including at least one of the first reference signal or the second reference signal. In one aspect, the SCell activation time may be between transmission of the ACK of the activation indication and a second time duration after receiving the at least one temporary reference signal. In another aspect, the SCell activation time may be between transmission of the ACK of the activation indication and a second time duration after receiving a last of the one or more reference signals on which the UE based the activation of the SCell. In another aspect, the SCell activation time may be between transmission of the ACK of the activation indication and a second time duration after receiving two or four reference signals including one of the first reference signal or the second reference signal. The UE may activate multiple SCells simultaneously, based on one or more reference signals including at least one temporary reference signal including the aperiodic tracking reference signal or the periodic tracking reference signal, whichever is received earliest from the multiple SCells. The UE may activate the multiple SCells based on one or more reference signals including at least one temporary reference signal including an aperiodic tracking reference signal or a periodic tracking reference signal, whichever is received within an earliest activation time for the multiple SCells. The UE may activate the multiple SCells based on one or more reference signals including at least one temporary reference signal including an aperiodic tracking reference signal or a periodic tracking reference signal, whichever is received latest from the multiple SCells. For example, at 726, the UE 702 may activate the SCell 706 based on one or more reference signals, including at least one of the received first reference signal and/or second reference signal. Furthermore, 918 may be performed by the SCell activation component 1540.

Figure 10:
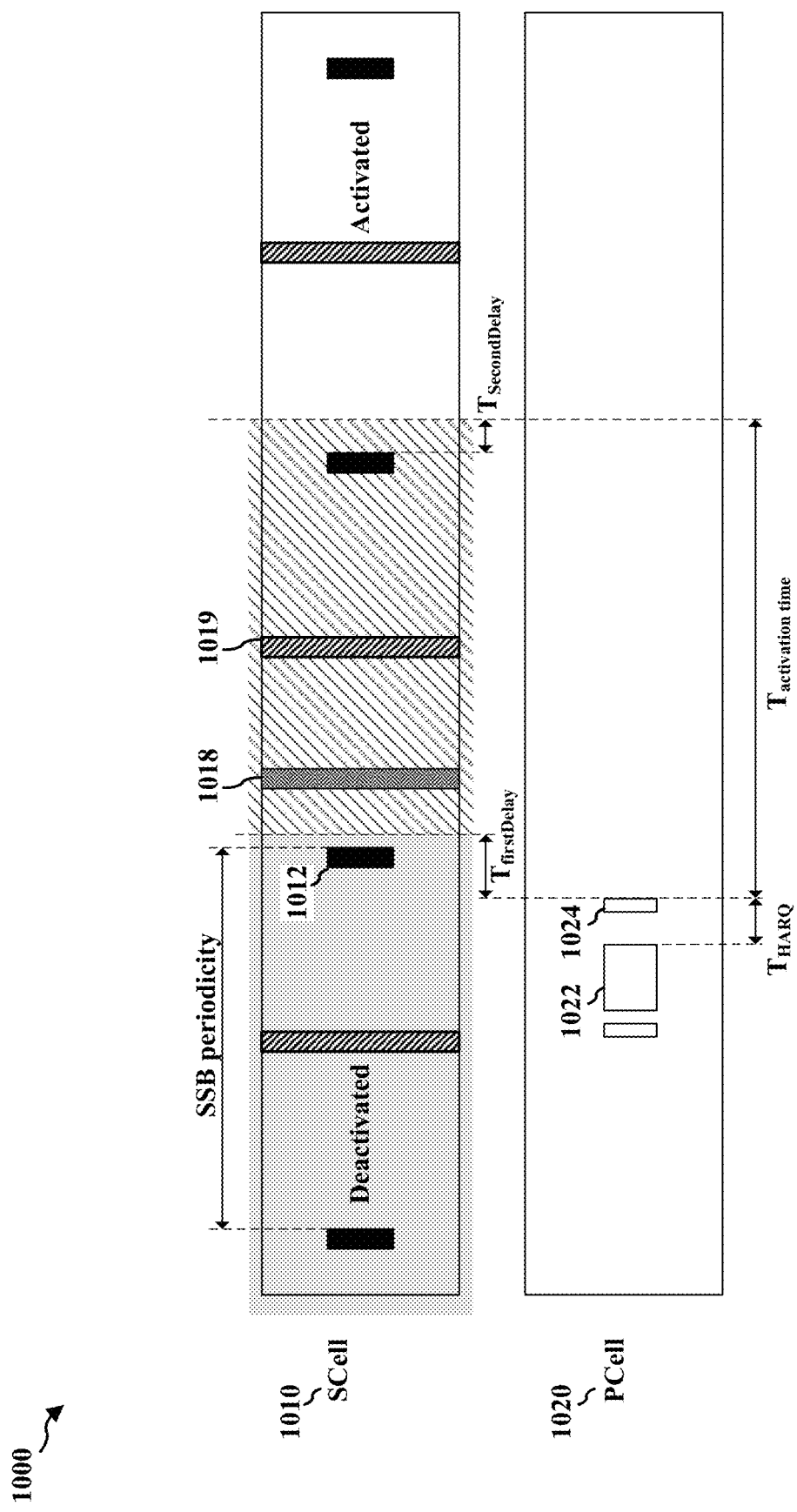
FIG. 10 illustrates an example of SCell activation of wireless communication.

FIG. 10 illustrates an example of SCell activation 1000 of wireless communication. The example of SCell activation 1000 includes an SCell 1010 and a PCell 1020. The example of SCell activation 1000 of wireless communication illustrates that the SCell 1010 may transmit a first temporary RS 1018, a second temporary RS 1019, and an SSB 1012. The first temporary RS 1018 may be an aperiodic tracking RS triggered by DCI or a MAC-CE, and the second temporary RS 1019 may be a periodic tracking RS triggered by an RRC signal. The UE may generate and transmit the ACK 1024 to the PCell 1020. For the SCell in the unlicensed band (or in the shared spectrum), the one or more RS 1018 and 1019 (an SSB or a temporary RS including a periodic tracking RS or an aperiodic tracking RS) may not be transmitted due to an LBT failure. That is, the UE may determine whether the SCell activation indication 1022 is implicitly canceled based on the transmission of the temporary RS including the first temporary RS 1018 or the second temporary RS 1019. The UE may perform a clear channel assessment to determine whether a channel measurement of the received power is greater than a threshold value. If the UE determines that the channel measurement of the received power is greater than the threshold value, the UE may determine that the window for $T_{activation\_time}$ based on the one or more RS 1018 and 1019 is actually used for data transmission and the temporary RS including the first temporary RS 1018 or the second temporary RS 1019 are not transmitted as indicated by the SCell activation indication 1022.

Aspects of the disclosure are not limited to the SCell 1010 in the unlicensed band (or in the shared spectrum) in the LBT failure. In some aspects, the same procedure may be applied when/if one or more RS 1018 and 1019 are not transmitted due to an overlapping UL transmission or DL reception of the other signal/channel a cancellation/preemption of DL reception. That is, the UE may receive DCI or a MAC-CE that may instruct the UL transmission, DL reception, cancellation, or preemption, which may instruct the UE not to use the one or more RS 1018 and 1019 may not be transmitted as indicated by the SCell activation indication.

Figure 11:
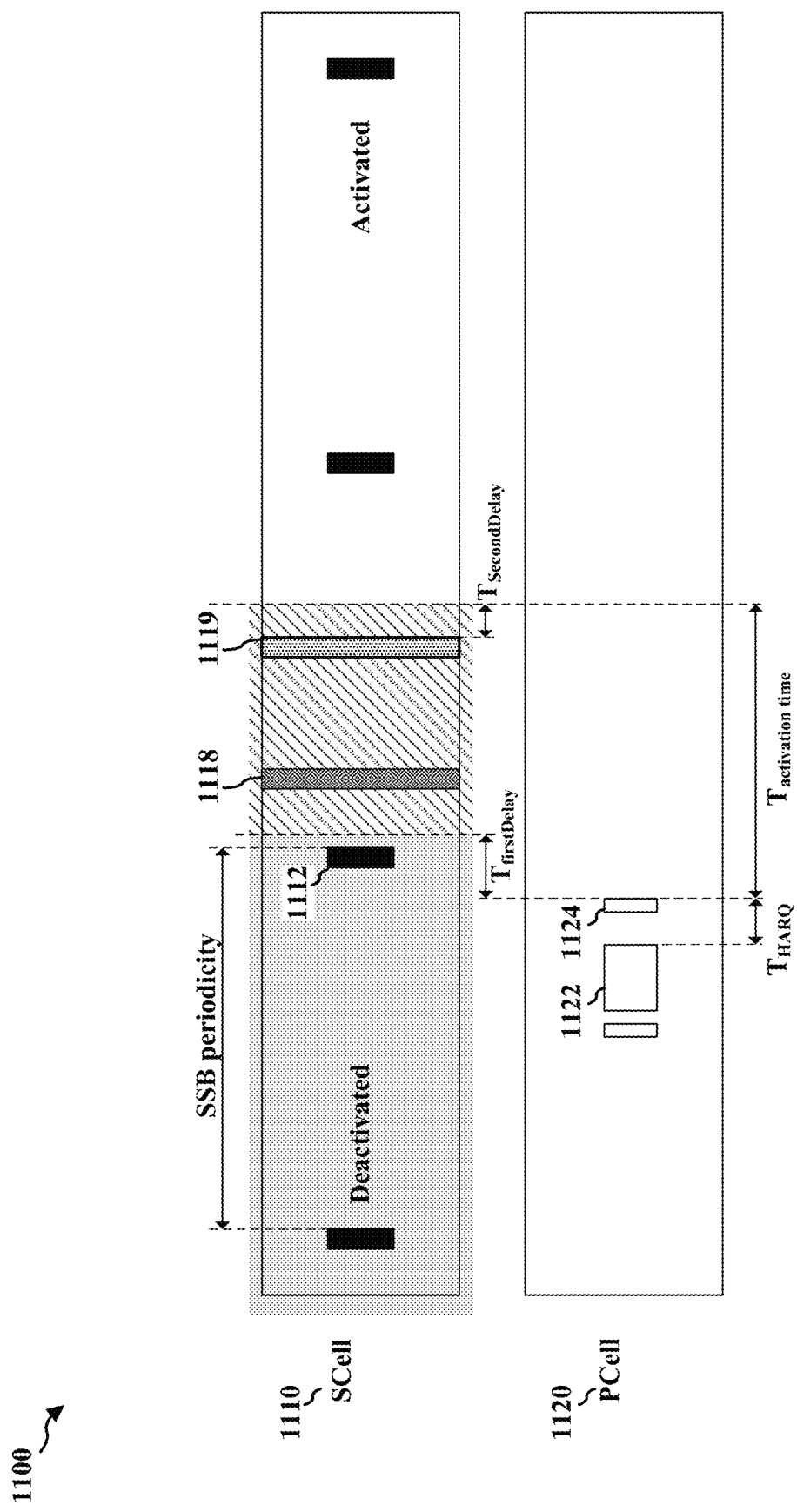
FIG. 11 illustrates an example of SCell activation of wireless communication.

FIG. 11 illustrates an example of SCell activation 1100 of wireless communication. The example of SCell activation 1100 includes an SCell 1110 and a PCell 1120. The example of SCell activation 1100 of wireless communication illustrates that the SCell 1110 may transmit a first temporary RS 1118, a second temporary RS 1119, and an SSB 1112. The first temporary RS 1118 and the second temporary RS 1119 may be aperiodic tracking RSs triggered by DCI or a MAC-CE. The UE may generate and transmit the ACK 1124 to the PCell 1120. The network may update the temporary RS resource, and eventually cancel/preempt the temporary RS. For such a case, the network or BS may indicate a new temporary RS resource by DCI or MAC-CE. That is, the UE may receive a new SCell activation indication 1122 instructing the UE to activate the SCell 1110 using a new temporary RS 1119. In response to determining that the RS resource is updated from the first temporary RS 1118 to the second temporary RS 1119, the UE may determine that the original SCell activation indication is no longer valid, and the first temporary RS 1118 may not be transmitted as indicated in the original SCell activation indication. Accordingly, the window for $T_{activation\_time}$ may be based on the new RS resource associated with the second temporary RS 1119. The network may indicate the cancellation/preemption via DCI or a MAC-CE. The DCI may be DCI sent to trigger a cancellation or offset of the temporary RS, or may be the same as the scheduling DCI for the UL/DL Tx/Rx overlapping with the initial A-TRS. The MAC-CE may directly trigger cancellation or offset of the temporary RS, or may be the same as the MAC-CE used to trigger another temporary RS on this carrier or other carriers. The MAC-CE may also be used to trigger SCell activation on other carriers.

In some aspects, the to-be-activated SCell for a wideband operation in the unlicensed band (or in the shared spectrum may include multiple LBT sub-bands, for example, every 20 MHz, and the temporary RS and/or the periodic tracking RS may be subject to LBT per the multiple LBT sub-bands. That is, a partial transmission of the temporary RS and/or the periodic tracking RS for the activation of the SCell in the frequency domain due to LBT failure in at least one part of the LBT sub-bands may not be accounted for valid transmission of the temporary RS for the purpose of the activation procedure.

Figure 12:
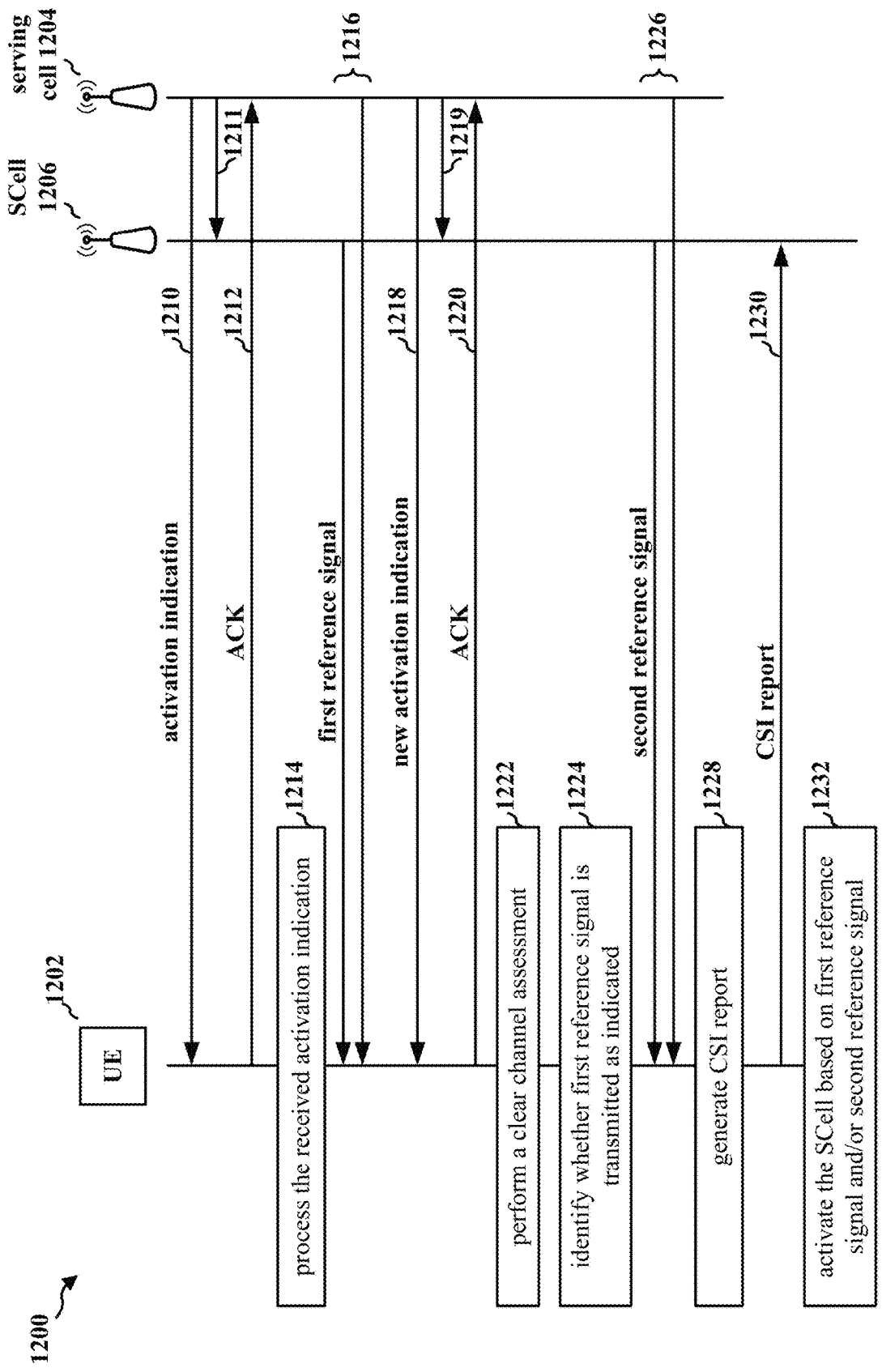
FIG. 12 illustrates a call-flow diagram of wireless communication.

FIG. 12 illustrates a call-flow diagram 1200 of wireless communication. The call-flow diagram 1200 may include a UE 1202, a serving cell 1204, and an SCell 1206 to be activated by the UE 1202. The UE 1202 may receive an SCell activation command or indication from the one or more active serving cells, e.g., the serving cell 1204. One or more temporary RS may be provided to expedite the SCell activation procedure, and the UE 1202 may expedite the SCell activation procedure using the one or more temporary RS received from the SCell 1206. The UE 1202 may activate the SCell 1206 no later than in slot n+K, and K may be determined based on at least in part the SCell activation time.

At 1210, the UE 1202 may receive, from the serving cell 1204, an activation indication for activating an SCell 1206. The activation indication may be received via one of a MAC-CE, DCI, or an RRC signal. The activation indication may indicate activating multiple SCells 1206 simultaneously, the multiple SCells 1206 including a first SCell and a second SCell. The first SCell and the second SCell may be in the same frequency band, in contiguous carriers in the same frequency band, or in a frequency range. At 1211, the serving cell 1204 may configure the SCell 1206 to transmit one or more RS, including a first reference signal and/or a second reference signal.

At 1212, the UE 1202 may transmit, to the serving cell 1204, an ACK of receiving the activation indication, where the activation indication is processed within a first time duration after the ACK is transmitted to the serving cell 1204.

At 1214, the UE 1202 may process the activation indication received from the serving cell 1204. The UE 1202 may receive the first reference signal and/or the second reference signal based on the processed activation indication.

At 1216, the UE 1202 may receive the first reference signal from the SCell 1206, the first reference signal including at least one temporary reference signal as indicated by the activation indication at 1210. The first reference signal may be a temporary RS, including an aperiodic tracking RS instructed by the MAC-CE or the DCI or a periodic tracking RS instructed by the RRC signal. Here, the first reference signal may be received from the active serving cell 1204.

At 1218, the UE 1202 may receive, from the serving cell 1204, a new activation indication for activating an SCell 1206. The activation indication may be received via one of the MAC-CE or the DCI. The activation indication may indicate activating multiple SCells 1206 simultaneously, the multiple SCells 1206 including a first SCell and a second SCell. The first SCell and the second SCell may be in the same frequency band, in contiguous carriers in the same frequency band, or in a frequency range. At 1219, the serving cell 1204 may configure the SCell 1206 to transmit one or more RS, including a first reference signal and/or a second reference signal.

At 1220, the UE 1202 may transmit, to the serving cell 1204, an ACK of receiving the new activation indication, where the activation indication is processed within a first time duration after the ACK is transmitted to the serving cell 1204.

At 1222, the UE 1202 may perform a clear channel assessment to determine whether a channel measurement is greater than a threshold value.

At 1224, the UE 1202 may identify whether the first reference signal is transmitted as indicated by the activation indication at 1210. The UE 1202 may identify that the first reference signal is not transmitted as indicated by the activation indication in response to determining that the channel measurement is greater than the threshold value at 1222. The UE 1202 may also receive, from the serving cell, an instruction to cancel the transmission of the first reference signal where the UE identifies that the first reference signal is not transmitted in response to receiving the instruction to cancel the transmitted first reference signal, the instruction to cancel the activation indication for the SCell based on the first reference signal being indicated by one of the MAC-CE or the DCI. The SCell may include multiple sub-bands, and the UE 1202 may perform a clear channel assessment to determine whether channel measurements are greater than a threshold value for at least one of the multiple sub-bands and identify that the first reference signal is not transmitted as indicated upon determining that the channel measurements of at least one of the multiple sub-bands are greater than a threshold value.

At 1226, the UE 1202 may receive the second reference signal from the SCell 1206, the first reference signal including at least one temporary reference signal as indicated by the new activation indication at 1218. The first reference signal may be a temporary RS, including an aperiodic tracking RS instructed by the MAC-CE or the DCI or a periodic tracking RS instructed by the RRC signal. Here, the first reference signal may be received from the active serving cell 1204.

At 1228, the UE 1202 may generate a CSI report of one of the first reference signal or the second reference signal on which the UE 1202 based the activation of the SCell 1206.

At 1230, the UE 1202 may transmit the CSI report of one of the first reference signal or the second reference signal on which the UE 1202 based the activation of the SCell 1206.

At 1232, the UE 1202 may activate the SCell 1206 based on one or more reference signals, including at least one of the received first reference signal and/or second reference signal. The UE 1202 may activate, upon identifying that the first reference signal is transmitted as indicated, the SCell based on one or more reference signals including the first reference signal or a second reference signal. The UE 1202 may receive the activation indication in slot n, and may activate the SCell 1206 no later than in slot n+K, where K is determined based on at least one of a time period between receiving the activation indication from the serving cell and transmitting an acknowledgment (ACK) of the activation indication to the serving cell, the SCell activation time, and a delay uncertainty in acquiring one or more first available CSI reporting resources. For example, the UE 1202 may receive the activation indication in slot n, and may activate the SCell 1206 no later than in in slot $$n + \frac{T_{HARQ} + T_{activation\_time} + T_{CSI\_Reporting}}{slot\ length}.$$

The $T_{activation\_time}$ may be the SCell activation time, and be determined based on one or more reference signals, including at least one of the first reference signal or the second reference signal. In one aspect, the SCell activation time may be between transmission of the ACK of the activation indication and a second time duration after receiving the second reference signal. In another aspect, the SCell activation time may be between transmission of the ACK of the activation indication and a second time duration after receiving the second reference signal.

The UE 1202 may activate multiple SCells 1206 simultaneously, based on one or more reference signals including at least one temporary reference signal including the aperiodic tracking reference signal or the periodic tracking reference signal, whichever is received earliest from the multiple SCells 1206. The UE 1202 may activate the multiple SCells 1206 based on one or more reference signals including at least one temporary reference signal including an aperiodic tracking reference signal or a periodic tracking reference signal, whichever is received within an earliest activation time for the multiple SCells 1206. The UE 1202 may activate the multiple SCells 1206 based on one or more reference signals including at least one temporary reference signal including an aperiodic tracking reference signal or a periodic tracking reference signal, whichever is received latest from the multiple SCells 1206.

Figure 13:
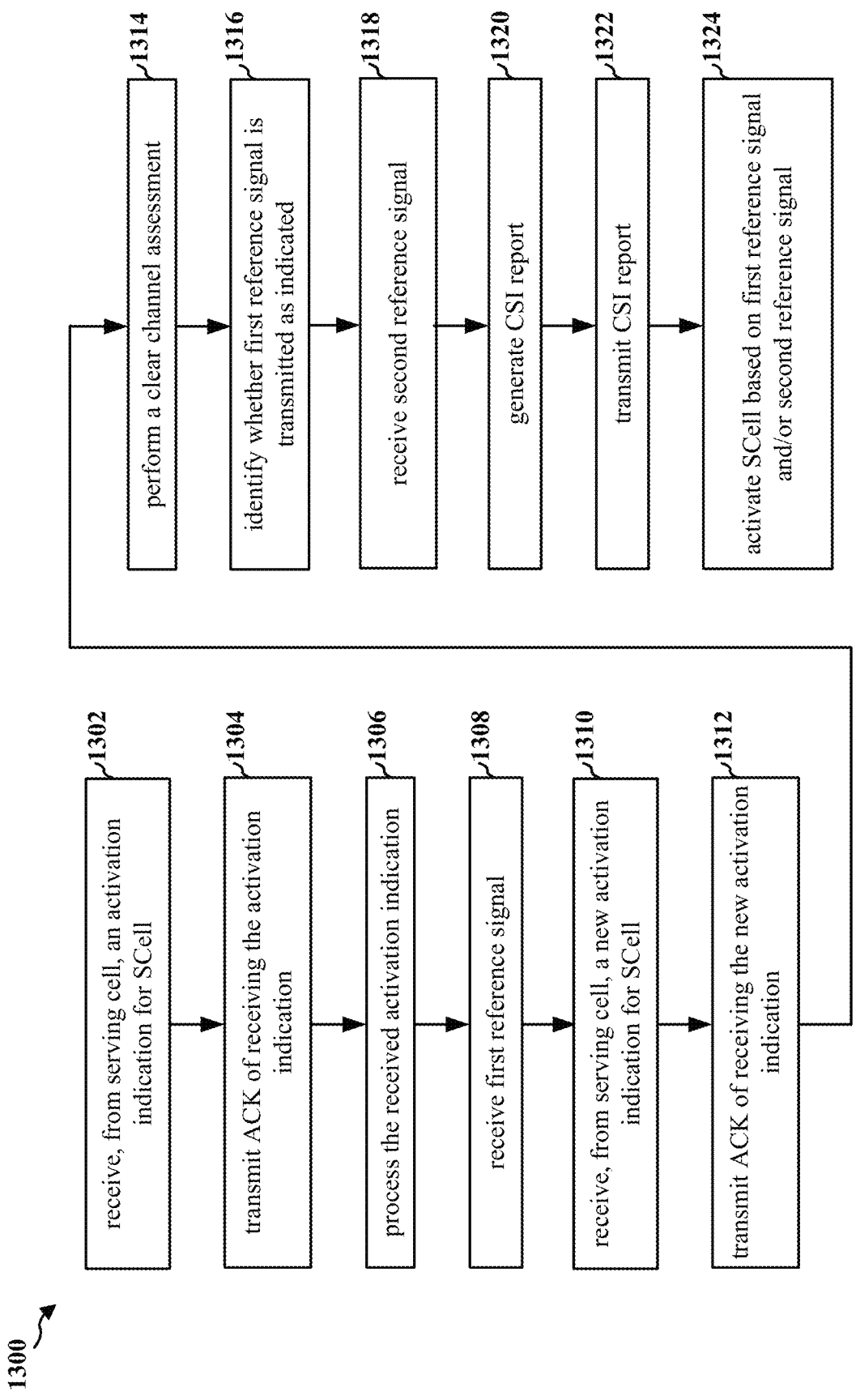
FIG. 13 is a flowchart of a method of wireless communication.

FIG. 13 is a flowchart 1300 of a method of wireless communication. The method may be performed by a UE (e.g., the UE 104, 1202; the apparatus 1502). The UE may receive an SCell activation command or indication from the one or more active serving cells, e.g., the serving cell. One or more temporary RS may be provided to expedite the SCell activation procedure, and the UE may expedite the SCell activation procedure using the one or more temporary RS received from the SCell. The UE may activate the SCell no later than in slot n+K, and K may be determined based on at least in part the SCell activation time.

At 1302, the UE may receive, from the serving cell, an activation indication for activating an SCell. The activation indication may be received via one of a MAC-CE, DCI, or RRC signal. The activation indication may indicate activating multiple SCells simultaneously, the multiple SCells including a first SCell and a second SCell. The first SCell and the second SCell may be in the same frequency band, in contiguous carriers in the same frequency band, or in a frequency range. For example, at 1210, the UE 1202 may receive, from the serving cell 1204, an activation indication for activating an SCell 1206. Furthermore, 1302 may be performed by the SCell activation component 1540.

At 1304, the UE may transmit, to the serving cell, an ACK of receiving the activation indication, wherein the activation indication is processed within a first time duration after the ACK is transmitted to the serving cell. For example, at 1212, the UE 1202 may transmit, to the serving cell 1204, an ACK of receiving the activation indication, where the activation indication is processed within a first time duration after the ACK is transmitted to the serving cell 1204. Furthermore, 1304 may be performed by the ACK component 1542.

At 1306, the UE may process the activation indication received from the serving cell. The UE may receive the first reference signal and/or the second reference signal based on the processed activation indication. For example, at 1214, the UE 1202 may process the activation indication received from the serving cell 1204. Furthermore, 1306 may be performed by the SCell activation component 1540.

At 1308, the UE may receive the first reference signal from the SCell, the first reference signal including at least one temporary reference signal as indicated by the activation indication at 1302. The first reference signal may be a temporary RS, including an aperiodic tracking RS instructed by the MAC-CE or the DCI or a periodic tracking RS instructed by the RRC signal. Here, the first reference signal may be received from the active serving cell. For example, at 1216, the UE 1202 may receive the first reference signal from the SCell 1206, the first reference signal including at least one temporary reference signal as indicated by the activation indication at 1210. Furthermore, 1308 may be performed by the SCell activation component 1540.

At 1310, the UE may receive, from the serving cell, a new activation indication for activating an SCell (i.e., as at 1118). The activation indication may be received via one of the MAC-CE or the DCI. The activation indication may indicate activating multiple SCells simultaneously, the multiple SCells including a first SCell and a second SCell. The first SCell and the second SCell may be in the same frequency band, in contiguous carriers in the same frequency band, or in a frequency range. For example, at 1218, the UE 1202 may receive, from the serving cell 1204, a new activation indication for activating an SCell 1206. Furthermore, 1310 may be performed by the SCell activation component 1540.

At 1312, the UE may transmit, to the serving cell, an ACK of receiving the new activation indication, where the activation indication is processed within a first time duration after the ACK is transmitted to the serving cell. For example, at 1220, the UE 1202 may transmit, to the serving cell 1204, an ACK of receiving the new activation indication, where the activation indication is processed within a first time duration after the ACK is transmitted to the serving cell 1204. Furthermore, 1312 may be performed by the ACK component 1542.

At 1314, the UE may perform a clear channel assessment to determine whether a channel measurement is greater than a threshold value. For example, at 1222, the UE 1202 may perform a clear channel assessment to determine whether a channel measurement is greater than a threshold value. Furthermore, 1314 may be performed by a LBT component 1546.

At 1316, the UE may identify whether the first reference signal is transmitted as indicated by the activation indication at 1302. The UE may identify that the first reference signal is not transmitted as indicated by the activation indication in response to determining that the channel measurement is greater than the threshold value at 1314. The UE may also receive, from the serving cell, an instruction to cancel the transmission of the first reference signal where the UE identifies that the first reference signal is not transmitted in response to receiving the instruction to cancel the transmitted first reference signal, the instruction to cancel the activation indication for the SCell based on the first reference signal being indicated by one of the MAC-CE or the DCI. The SCell may include multiple sub-bands, and the UE may perform a clear channel assessment to determine whether channel measurements are greater than a threshold value for at least one of the multiple sub-bands and identify that the first reference signal is not transmitted as indicated upon determining that the channel measurements of at least one of the multiple sub-bands are greater than a threshold value. For example, at 1224, the UE 1202 may identify whether the first reference signal is transmitted as indicated by the activation indication at 1210. Furthermore, 1316 may be performed by the SCell activation component 1540.

At 1318, the UE may receive the second reference signal from the SCell 1206, the second reference signal including at least one temporary reference signal as indicated by the new activation indication received at 1312. The second reference signal may be a temporary RS including an aperiodic tracking RS instructed by the MAC-CE or the DCI. Here, the second reference signal may be received from the active serving cell. For example, at 1226, the UE 1202 may receive the second reference signal from the SCell 1206, the first reference signal including at least one temporary reference signal as indicated by the new activation indication at 1218. Furthermore, 1318 may be performed by the SCell activation component 1540.

At 1320, the UE may generate a CSI report of one of the first reference signal or the second reference signal on which the UE based the activation of the SCell. For example, at 1228, the UE 1202 may generate a CSI report of one of the first reference signal or the second reference signal on which the UE 1202 based the activation of the SCell 1206. Furthermore, 1320 may be performed by the CSI component 1544.

At 1322, the UE may transmit the CSI report of one of the first reference signal or the second reference signal on which the UE based the activation of the SCell. For example, at 1230, the UE 1202 may transmit the CSI report of one of the first reference signal or the second reference signal on which the UE 1202 based the activation of the SCell 1206. Furthermore, 1322 may be performed by the CSI component 1544.

At 1324, the UE may activate the SCell based on one or more reference signals, including at least one of the received first reference signal and/or second reference signal. The UE may activate, upon identifying that the first reference signal is transmitted as indicated, the SCell based on one or more reference signals including the first reference signal or a second reference signal. The UE may receive the activation indication in slot n, and may activate the SCell no later than in slot n+K, where K is determined based on at least one of a time period between receiving the activation indication from the serving cell and transmitting an acknowledgment (ACK) of the activation indication to the serving cell, the SCell activation time, and a delay uncertainty in acquiring one or more first available CSI reporting resources. For example, the UE may receive the activation indication in slot n, and may activate the SCell no later than in in slot $$n + \frac{T_{HARQ} + T_{activation\_time} + T_{CSI\_Reporting}}{\text{slot length}}.$$

The $T_{activation\_time}$ may be the SCell activation time, and be determined based on one or more reference signals, including at least one of the first reference signal or the second reference signal. In one aspect, the SCell activation time may be between transmission of the ACK of the activation indication and a second time duration after receiving the second reference signal. In another aspect, the SCell activation time may be between transmission of the ACK of the activation indication and a second time duration after receiving the second reference signal. The UE may activate multiple SCells simultaneously, based on one or more reference signals including at least one temporary reference signal including the aperiodic tracking reference signal or the periodic tracking reference signal, whichever is received earliest from the multiple SCells. The UE may activate the multiple SCells based on one or more reference signals including at least one temporary reference signal including an aperiodic tracking reference signal or a periodic tracking reference signal, whichever is received within an earliest activation time for the multiple SCells. The UE may activate the multiple SCells based on one or more reference signals including at least one temporary reference signal including an aperiodic tracking reference signal or a periodic tracking reference signal, whichever is received latest from the multiple SCells. For example, at 1232, the UE 1202 may activate the SCell 1206 based on one or more reference signals, including at least one of the received first reference signal and/or second reference signal. Furthermore, 1324 may be performed by the SCell activation component 1540.

Figure 14:
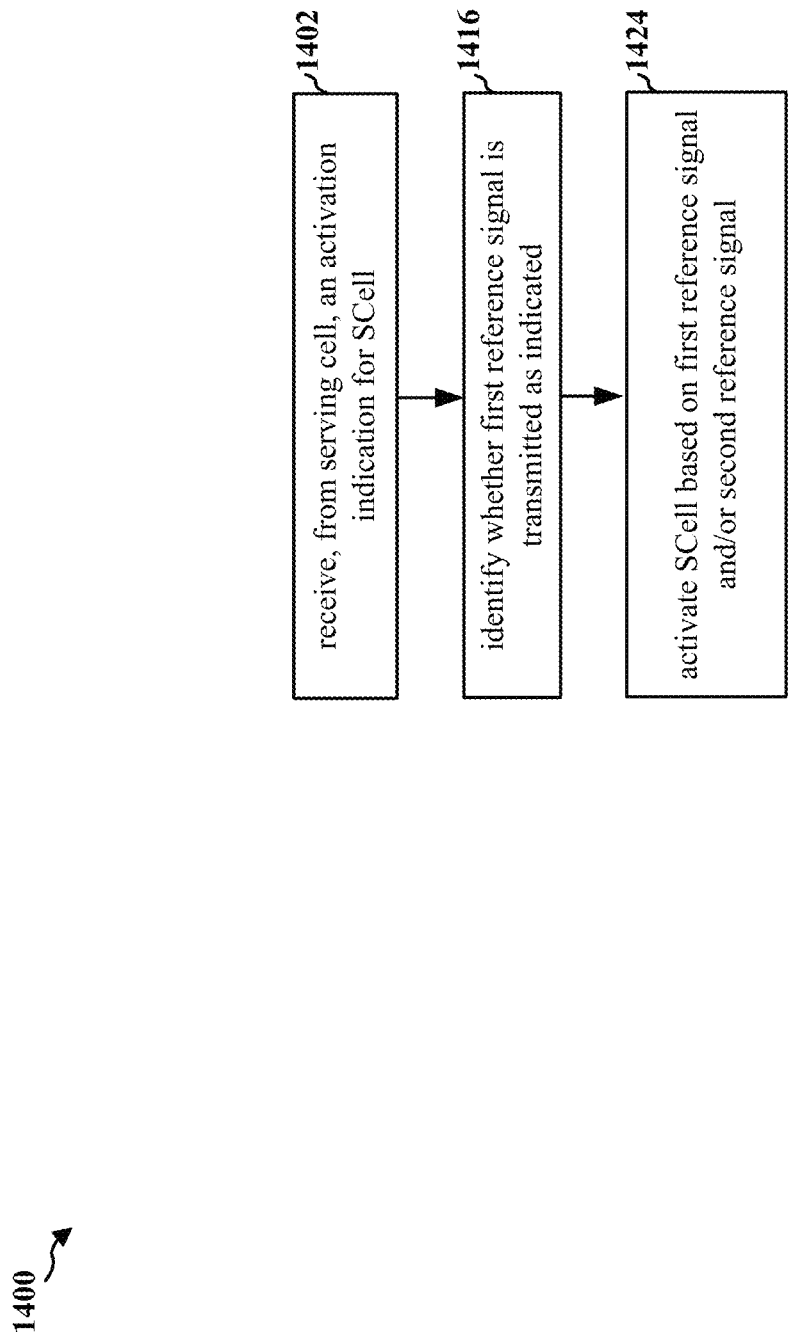
FIG. 14 is a flowchart of a method of wireless communication.

FIG. 14 is a flowchart 1400 of a method of wireless communication. The method may be performed by a UE (e.g., the UE 104, 1202; the apparatus 1502). The UE may receive an SCell activation command or indication from the one or more active serving cells, e.g., the serving cell. One or more temporary RS may be provided to expedite the SCell activation procedure, and the UE may expedite the SCell activation procedure using the one or more temporary RS received from the SCell. The UE may activate the SCell no later than in slot n+K, and K may be determined based on at least in part the SCell activation time.

At 1402, the UE may receive, from the serving cell, an activation indication for activating an SCell. The activation indication may be received via one of a MAC-CE, DCI, or RRC signal. The activation indication may indicate activating multiple SCells simultaneously, the multiple SCells including a first SCell and a second SCell. The first SCell and the second SCell may be in the same frequency band, in contiguous carriers in the same frequency band, or in a frequency range. For example, at 1210, the UE 1202 may receive, from the serving cell 1204, an activation indication for activating an SCell 1206. Furthermore, 1402 may be performed by the SCell activation component 1540.

At 1416, the UE may identify whether the first reference signal is transmitted as indicated by the activation indication at 1402. The UE may identify that the first reference signal is not transmitted as indicated by the activation indication in response to determining that the channel measurement is greater than the threshold value. The UE may also receive, from the serving cell, an instruction to cancel the transmission of the first reference signal where the UE identifies that the first reference signal is not transmitted in response to receiving the instruction to cancel the transmitted first reference signal, the instruction to cancel the activation indication for the SCell based on the first reference signal being indicated by one of the MAC-CE or the DCI. The SCell may include multiple sub-bands, and the UE may perform a clear channel assessment to determine whether channel measurements are greater than a threshold value for at least one of the multiple sub-bands and determine that the first reference signal is not transmitted as indicated upon determining that the channel measurements of at least one of the multiple sub-bands are greater than a threshold value. For example, at 1224, the UE 1202 may identify whether the first reference signal is transmitted as indicated by the activation indication at 1210. Furthermore, 1416 may be performed by the SCell activation component 1540.

At 1424, the UE may activate the SCell based on one or more reference signals, including at least one of the received first reference signal and/or second reference signal. The UE may activate, upon identifying that the first reference signal is transmitted as indicated, the SCell based on one or more reference signals including the first reference signal or a second reference signal. The UE may receive the activation indication in slot n, and may activate the SCell no later than in slot n+K, where K is determined based on at least one of a time period between receiving the activation indication from the serving cell and transmitting an acknowledgment (ACK) of the activation indication to the serving cell, the SCell activation time, and a delay uncertainty in acquiring one or more first available CSI reporting resources. For example, the UE may receive the activation indication in slot n, and may activate the SCell no later than in in slot $$n + \frac{T_{HARQ} + T_{activation\_time} + T_{CSI\_Reporting}}{\text{slot length}}.$$

The $T_{activation\_time}$ may be the SCell activation time, and be determined based on one or more reference signals, including at least one of the first reference signal or the second reference signal. In one aspect, the SCell activation time may be between transmission of the ACK of the activation indication and a second time duration after receiving the second reference signal. In another aspect, the SCell activation time may be between transmission of the ACK of the activation indication and a second time duration after receiving the second reference signal. The UE may activate multiple SCells simultaneously, based on one or more reference signals including at least one temporary reference signal including the aperiodic tracking reference signal or the periodic tracking reference signal, whichever is received earliest from the multiple SCells. The UE may activate the multiple SCells based on one or more reference signals including at least one temporary reference signal including an aperiodic tracking reference signal or a periodic tracking reference signal, whichever is received within an earliest activation time for the multiple SCells. The UE may activate the multiple SCells based on one or more reference signals including at least one temporary reference signal including an aperiodic tracking reference signal or a periodic tracking reference signal, whichever is received latest from the multiple SCells. For example, at 1232, the UE 1202 may activate the SCell 1206 based on one or more reference signals, including at least one of the received first reference signal and/or second reference signal. Furthermore, 1424 may be performed by the SCell activation component 1540.

Figure 15:
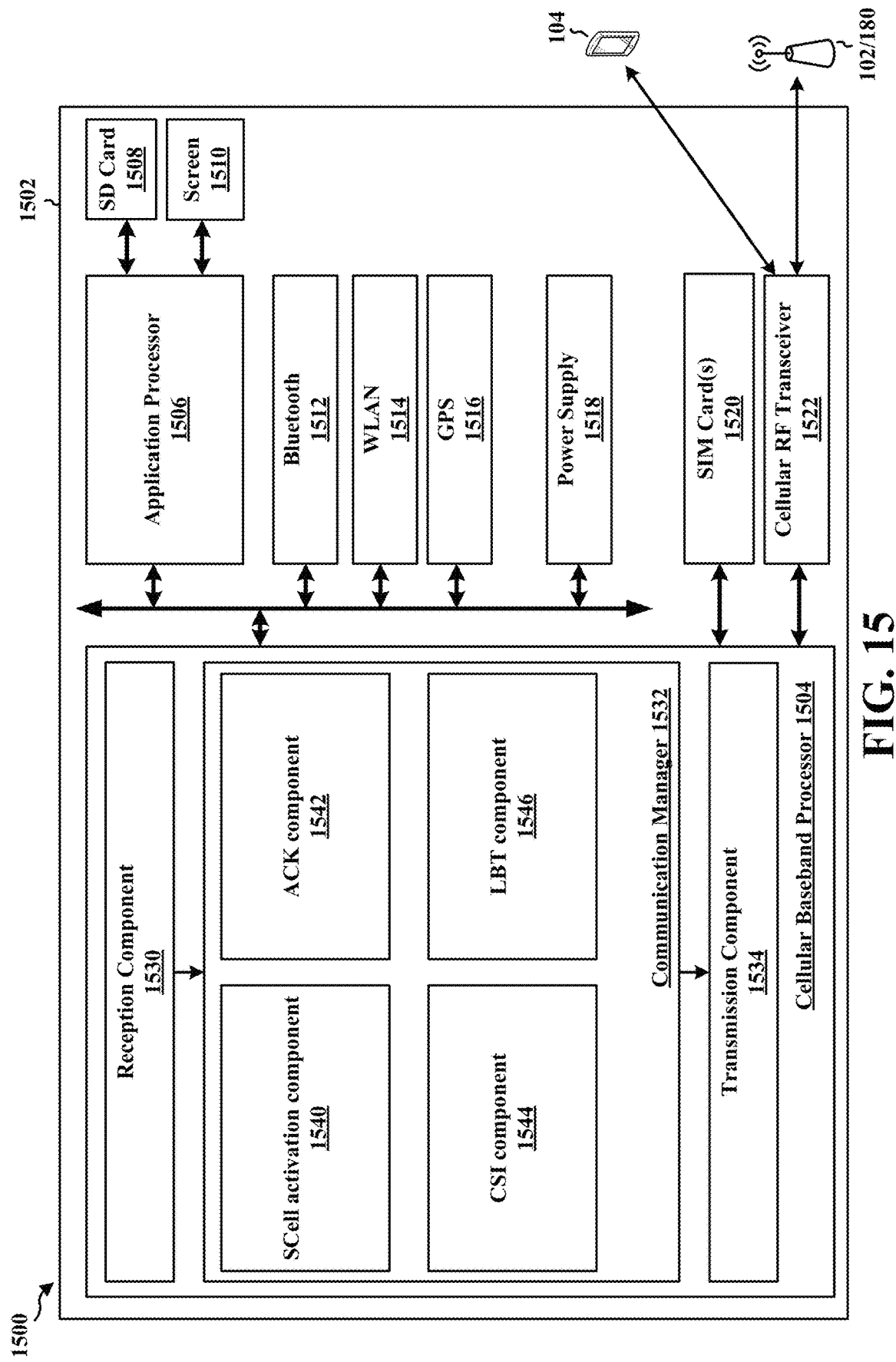
FIG. 15 is a diagram illustrating an example of a hardware implementation for an example apparatus.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes an SCell activation component 1540 that is configured to receive, from a serving cell, an activation indication for activating an SCell, process the received activation indication, receive a first reference signal and/or a second reference signal, identify whether the second reference signal is received after processing the activation indication and before the expiration of an SCell activation time, identify whether the first reference signal is transmitted as indicated by the activation indication, and activate the SCell based on one or more reference signals, including at least one of the received first reference signal and/or second reference signal, e.g., as described in connection with 802, 806, 808, 810, 812, 818, 902, 908, 912, 918, 1302, 1306, 1308, 1310, 1316, 1318, 1324, 1402, 1416, and 1424. The communication manager 1532 further includes an ACK component 1542 that is configured to transmit, to the serving cell, an ACK of receiving the activation indication, e.g., as described in connection with 804, 1304, and 1312. The communication manager 1532 further includes a CSI component 1544 that is configured to generate a CSI report of one of the first reference signal or the second reference signal on which the UE based the activation of the SCell and transmit the CSI, e.g., as described in connection with 814, 816, 1320, and 1322. The communication manager 1532 further includes an LBT component 1546 that is configured to perform a clear channel assessment to determine whether a channel measurement is greater than a threshold value, e.g., as described in connection with 1314.

The apparatus may include additional components that perform each of the blocks of the algorithm in the flowcharts of FIGS. 7, 8, 9, 12, 13, and 14. As such, each block in the flowcharts of FIGS. 7, 8, 9, 12, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for receiving, from a serving cell, an activation indication for a SCell, means for receiving a first reference signal from the SCell, the first reference signal including at least one temporary reference signal, means for identifying whether a second reference signal is received after processing the activation indication and before an expiration of an SCell activation time, and means for activating, upon identifying that the second reference signal is received, the SCell based on one or more reference signals including at least one of the first reference signal or the second reference signal. The apparatus 1502 includes means for transmitting, to the serving cell, an ACK of receiving the activation indication, where the activation indication is processed within a first time duration after the ACK is transmitted to the serving cell and means for transmitting, a CSI report of one of the first reference signal or the second reference signal on which the UE based the activation of the SCell. The apparatus 1502 includes means for identifying whether the second reference signal is received from the active serving cell. The apparatus 1502 includes means for receiving, from a serving cell, an activation indication for a SCell based on a first reference signal, the activation indication indicating a transmission of the first reference signal for activating the SCell, means for identifying whether the first reference signal is transmitted as indicated, and means for activating, upon identifying that the first reference signal is transmitted as indicated, the SCell based on one or more reference signals including the first reference signal or a second reference signal. The apparatus 1502 includes means for transmitting, to the serving cell, an ACK of receiving the activation indication, where the activation indication is processed within a first time duration after the ACK is transmitted to the serving cell, and means for receiving a new activation indication indicating a transmission of a second reference signal for activating the SCell. The apparatus 1502 includes means for performing a clear channel assessment to determine whether channel measurements are greater than a threshold value for at least one of the multiple sub-bands, and means for identifying that the first reference signal is not transmitted as indicated upon determining that the channel measurements of at least one of the multiple sub-bands are greater than a threshold value. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

A UE may receive, from a serving cell, an activation indication for a SCell, receiving a first reference signal from the SCell, the first reference signal including at least one temporary reference signal, identify whether a second reference signal is received after processing the activation indication and before an expiration of an SCell activation time, and activate, upon identifying that the second reference signal is received, the SCell based on one or more reference signals including at least one of the first reference signal or the second reference signal.

The UE may transmit, to the serving cell, an ACK of receiving the activation indication, where the activation indication is processed within a first time duration after the ACK is transmitted to the serving cell. The UE may transmit a CSI report of one of the first reference signal or the second reference signal on which the UE based the activation of the SCell.

The UE may activate the SCell no later than in slot n+K, and K may be determined based on at least in part the SCell activation time. In one aspect, the activation indication may be received via one of a MAC-CE or DCI, and the at least one temporary reference signal includes an aperiodic tracking reference signal, and the activation indication indicates the aperiodic tracking reference signal transmitted by the SCell. The SCell activation time may be the SCell activation time between transmission of the ACK of the activation indication and a second time duration after receiving the at least one temporary reference signal, In another aspect, the activation indication may be received via RRC signaling, and the at least one temporary reference signal includes a periodic tracking reference signal, and the activation indication indicates the periodic tracking reference signal transmitted by the SCell. The SCell activation time may be the SCell activation time between transmission of the ACK of the activation indication and a second time duration after receiving a last of one or more reference signals on which the UE based the activation of the SCell. The activation indication may indicate activating multiple SCells simultaneously, and the multiple SCells may be in the same frequency band, in contiguous carriers in the same frequency band, or in a frequency range.

The UE may receive, from a serving cell, an activation indication for the SCell based on a first reference signal, the activation indication indicating a transmission of the first reference signal for activating the SCell, identify whether the first reference signal is transmitted as indicated, and activating, upon identifying that the first reference signal is transmitted as indicated, the SCell based on one or more reference signals including the first reference signal or a second reference signal. The UE may transmit, to the serving cell, the ACK of receiving the activation indication, where the activation indication is processed within a first time duration after the ACK is transmitted to the serving cell.

The first reference signal may include at least one of a periodic tracking reference signal or an aperiodic tracking reference signal. The UE may identify whether the first reference signal is transmitted as indicated by performing a clear channel assessment to determine whether a channel measurement is greater than a threshold value, and identifying that the first reference signal is not transmitted as indicated by the activation indication in response to determining that the channel measurement is greater than the threshold value.

The UE may receive, from the serving cell, an instruction to cancel the transmission of the first reference signal where the UE identifies that the first reference signal is not transmitted in response to receiving the instruction to cancel the transmitted first reference signal, and where the instruction to cancel the activation indication for the SCell based on the first reference signal is indicated by one of a MAC-CE or DCI.

The UE may receive, upon identifying that the first reference signal is not transmitted as indicated, a second reference signal from the SCell, and activate, upon identifying that the first reference signal is not transmitted as indicated, the SCell based on the second reference signal received from the SCell. The SCell activation time may be the SCell activation time between transmission of the ACK of the activation indication and a second time duration after receiving the second reference signal.

The UE may receive a new activation indication indicating a transmission of a second reference signal for activating the SCell, where, upon receiving the new activation indication, the UE identifies that the first reference signal is not transmitted as indicated.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, the method including: receiving, from a serving cell, an activation indication for an SCell, receiving a first reference signal from the SCell, the first reference signal including at least one temporary reference signal, identifying whether a second reference signal is received after processing the activation indication and before an expiration of an SCell activation time, and activating, upon identifying that the second reference signal is received, the SCell based on one or more reference signals including at least one of the first reference signal or the second reference signal.

Aspect 2 is the method of aspect 1, further including transmitting, to the serving cell, an ACK of receiving the activation indication, where the activation indication is processed within a first time duration after the ACK is transmitted to the serving cell.

Aspect 3 is the method of any of aspects 1 and 2, further includes transmitting, a CSI report of one of the first reference signal or the second reference signal on which the UE based the activation of the SCell.

Aspect 4 is the method of any of aspects 1 to 3, where the activation indication is received via one of a MAC-CE or DCI.

Aspect 5 is the method of aspect 4, where the at least one temporary reference signal includes an aperiodic tracking reference signal, and the activation indication indicates the aperiodic tracking reference signal transmitted by the SCell.

Aspect 6 is the method of aspect 5, where the UE activates the SCell no later than in slot $$n + \frac{T_{HARQ} + T_{activation\_time} + T_{CSI\_Reporting}}{\text{slot length}},$$

where the activation indication is received in slot n, $T_{HARQ}$ is a time period between receiving the activation indication from the serving cell and transmitting an acknowledgment (ACK) of the activation indication to the serving cell, $T_{activation\_time}$ is the SCell activation time between transmission of the ACK of the activation indication and a second time duration after receiving the at least one temporary reference signal, and $T_{CSI\_reporting}$ is a delay uncertainty in acquiring one or more first available CSI reporting resources.

Aspect 7 is the method of any of aspects 1 to 3, where the activation indication is received via RRC signaling.

Aspect 8 is the method of aspect 7, where the at least one temporary reference signal includes a periodic tracking reference signal, and the activation indication indicates the periodic tracking reference signal transmitted by the SCell.

Aspect 9 is the method of aspect 8, where the UE activates the SCell no later than in slot $$n + \frac{T_{HARQ} + T_{activation\_time} + T_{CSI\_Reporting}}{\text{slot length}},$$

where the activation indication is received in slot n, $T_{HARQ}$ is a time period between receiving the activation indication from the serving cell and transmitting the ACK of the activation indication to the serving cell, $T_{activation\_time}$ is the SCell activation time between transmission of the ACK of the activation indication and a second time duration after receiving a last of one or more reference signals on which the UE based the activation of the SCell, and $T_{CSI\_reporting}$ is a delay uncertainty in acquiring one or more first available CSI reporting resources.

Aspect 10 is the method of any of aspects 1 to 9, where the first reference signal is received from an active serving cell, and where the UE identifies whether the second reference signal is received from the active serving cell.

Aspect 11 is the method of any of aspects 1 to 10, where the first reference signal and the second reference signal are assumed to be quasi-co-located with each other.

Aspect 12 is the method of any of aspects 1 to 11, where the activation indication indicates activating multiple SCells simultaneously, the multiple SCells including a first SCell and a second SCell.

Aspect 13 is the method of aspect 12, where the first SCell and the second SCell are in a same frequency band, in contiguous carriers in the same frequency band, or in a frequency range.

Aspect 14 is the method of any of aspects 12 and 13, where the UE activates the multiple SCells based on one or more reference signals including at least one temporary reference signal including an aperiodic tracking reference signal or a periodic tracking reference signal, whichever is received earliest from the multiple SCells.

Aspect 15 is the method of any of aspects 12 to 14, where the UE activates the multiple SCells based on one or more reference signals including at least one temporary reference signal including an aperiodic tracking reference signal or a periodic tracking reference signal, whichever is received within an earliest activation time for the multiple SCells.

Aspect 16 is the method of any of aspects 12 to 15, where the UE activates the multiple SCells based on one or more reference signals including at least one temporary reference signal including an aperiodic tracking reference signal or a periodic tracking reference signal, whichever is received latest from the multiple SCells.

Aspect 17 is the method of any of aspects 1 to 5, 7, 8, 10 to 16, where the UE activates the SCell no later than in slot $$n + \frac{T_{HARQ} + T_{activation\_time} + T_{CSI\_Reporting}}{\text{slot length}},$$

where the activation indication is received in slot n, $T_{HARQ}$ is a time period between receiving the activation indication from the serving cell and transmitting the ACK of the activation indication to the serving cell, $T_{activation\_time}$ is the SCell activation time between transmission of the ACK of the activation indication and a second time duration after receiving two reference signals including one of the first reference signal or the second reference signal, and $T_{CSI\_reporting}$ is a delay uncertainty in acquiring one or more first available CSI reporting resources.

Aspect 18 is the method of any of aspects 1 to 5, 7, 8, 10 to 16, where the UE activates the SCell no later than in slot $$n + \frac{T_{HARQ} + T_{activation\_time} + T_{CSI\_Reporting}}{\text{slot length}},$$

where the activation indication is received in slot n, $T_{HARQ}$ is a time period between receiving the activation indication from the serving cell and transmitting the ACK of the activation indication to the serving cell, $T_{activation\_time}$ is the SCell activation time between transmission of the ACK of the activation indication and a second time duration after receiving four reference signals including one of the first reference signal or the second reference signal, and $T_{CSI\_reporting}$ is a delay uncertainty in acquiring one or more first available CSI reporting resources.

Aspect 19 is an apparatus for wireless communication including at least one processor coupled to a memory and configured to implement a method as in any of aspects 1 to 18.

Aspect 20 is an apparatus for wireless communication including means for implementing a method as in any of aspects 1 to 18.

Aspect 21 is a computer-readable medium storing computer executable code, where the code when executed by a processor causes the processor to implement a method as in any of aspects 1 to 18.

Aspect 22 is a method of wireless communication of a UE, the method including: receiving, from a serving cell, an activation indication for a secondary cell (SCell) based on a first reference signal, the activation indication indicating a transmission of the first reference signal for activating the SCell, identifying whether the first reference signal is transmitted as indicated, and activating, upon identifying that the first reference signal is transmitted as indicated, the SCell based on one or more reference signals including the first reference signal or a second reference signal.

Aspect 23 is the method of aspect 22, further including transmitting, to the serving cell, an acknowledgment (ACK) of receiving the activation indication, where the activation indication is processed within a first time duration after the ACK is transmitted to the serving cell.

Aspect 24 is the method of any of aspects 22 and 23, where the first reference signal includes at least one of a periodic tracking reference signal or an aperiodic tracking reference signal.

Aspect 25 is the method of any of aspects 22 to 24, where identifying whether the first reference signal is transmitted as indicated includes performing a clear channel assessment to determine whether a channel measurement is greater than a threshold value, and identifying that the first reference signal is not transmitted as indicated by the activation indication in response to determining that the channel measurement is greater than the threshold value.

Aspect 26 is the method of any of aspects 22 to 25, further includes receiving, from the serving cell, an instruction to cancel the transmission of the first reference signal where the UE identifies that the first reference signal is not transmitted in response to receiving the instruction to cancel the transmitted first reference signal, and where the instruction to cancel the activation indication for the SCell based on the first reference signal is indicated by one of a MAC-CE or DCI.

Aspect 27 is the method of any of aspects 22 to 26, further including receiving, upon identifying that the first reference signal is not transmitted as indicated, a second reference signal from the SCell, and activating, upon identifying that the first reference signal is not transmitted as indicated, the SCell based on the second reference signal received from the SCell.

Aspect 28 is the method of aspect 27, where the UE activates the SCell no later than in slot $$n + \frac{T_{HARQ} + T_{activation\_time} + T_{CSI\_Reporting}}{\text{slot length}},$$

where the activation indication is received in slot n, $T_{HARQ}$ is a time period between receiving the activation indication from the serving cell transmitting an ACK of the activation indication to the serving cell, $T_{activation\_time}$ is the SCell activation time between transmission of the ACK of the activation indication and a second time duration after receiving the second reference signal, and $T_{CSI\_reporting}$ is a delay uncertainty in acquiring one or more first available CSI reporting resources.

Aspect 29 is the method of any of aspects 22 to 26, further including receiving a new activation indication indicating a transmission of a second reference signal for activating the SCell, where, upon receiving the new activation indication, the UE identifies that the first reference signal is not transmitted as indicated.

Aspect 30 is the method of aspect 29, where the UE activates the SCell no later than in slot $$n + \frac{T_{HARQ} + T_{activation\_time} + T_{CSI\_Reporting}}{\text{slot length}},$$

where the activation indication is received in slot n, $T_{HARQ}$ is a time period between receiving the activation indication from the serving cell and transmitting an ACK of the activation indication to the serving cell, $T_{activation\_time}$ is the SCell activation time between transmission of the ACK of the activation indication and a second time duration after receiving the second reference signal, and $T_{CSI\_reporting}$ is a delay uncertainty in acquiring one or more first available CSI reporting resources.

Aspect 31 is the method of any of aspects 22 to 30, where the SCell includes multiple sub-bands, and where identifying whether the first reference signal is transmitted as indicated includes performing a clear channel assessment to determine whether channel measurements are greater than a threshold value for at least one of the multiple sub-bands, and identifying, that the first reference signal is not transmitted as indicated upon determining that the channel measurements of at least one of the multiple sub-bands are greater than a threshold value.

Aspect 32 is an apparatus for wireless communication including at least one processor coupled to a memory and configured to implement a method as in any of aspects 22 to 31.

Aspect 33 is an apparatus for wireless communication including means for implementing a method as in any of aspects 22 to 31.

Aspect 34 is a computer-readable medium storing computer executable code, where the code when executed by a processor causes the processor to implement a method as in any of aspects 22 to 31.

What is claimed is:

1. An apparatus for wireless communication at a user equipment (UE), comprising:
at least one memory; and
at least one processor coupled to the at least one memory and configured to:
receive, from a serving cell, an activation indication for a secondary cell (SCell);
receive a first reference signal from the SCell, the first reference signal including at least one temporary reference signal;
identify whether a second reference signal is received after processing the activation indication and before an expiration of an SCell activation time; and
activate, upon identifying that the second reference signal is received, the SCell based on one or more reference signals including at least one of the first reference signal or the second reference signal.

2. The apparatus of claim 1, wherein the at least one processor is further configured to:
transmit, to the serving cell, an acknowledgment (ACK) for the activation indication; and process the activation indication within a first time duration after the ACK is transmitted to the serving cell.

3. The apparatus of claim 1, wherein the at least one processor is further configured to:
transmit, a channel state information (CSI) report of one of the first reference signal or the second reference signal on which the UE based the activation of the SCell.

4. The apparatus of claim 1, wherein the at least one temporary reference signal includes an aperiodic tracking reference signal, and the activation indication indicates the aperiodic tracking reference signal transmitted by the SCell, and
wherein the activation indication is included in one of a medium access control (MAC) control element (CE) (MAC-CE) or downlink control information (DCI).

5. The apparatus of claim 4, wherein the at least one processor is configured to:
activate the SCell no later than in slot n+K, where slot n represents a slot in which the activation indication is received, and K is based on at least one of a time period between receiving the activation indication from the serving cell and transmitting an acknowledgment (ACK) of the activation indication to the serving cell, the SCell activation time between transmission of the ACK of the activation indication and a second time duration after receiving the at least one temporary reference signal, and a delay uncertainty in acquiring one or more first available CSI reporting resources.

6. The apparatus of claim 1, wherein the at least one temporary reference signal includes a periodic tracking reference signal, and the activation indication indicates the periodic tracking reference signal transmitted by the SCell.

7. The apparatus of claim 6, wherein the at least one processor is configured to:
activate the SCell no later than in slot n+K, where slot n represents a slot in which the activation indication is received, and K is based on at least one of a time period between receiving the activation indication from the serving cell and transmitting an acknowledgment (ACK) of the activation indication to the serving cell, the SCell activation time between transmission of the ACK of the activation indication and a second time duration after receiving a last of the one or more reference signals on which the UE based the activation of the SCell, and a delay uncertainty in acquiring one or more first available CSI reporting resources.

8. The apparatus of claim 6, wherein the activation indication is included in radio resource control (RRC) signaling.

9. The apparatus of claim 1, wherein the first reference signal is received from an active serving cell, and
wherein the at least one processor is further configured to identify whether the second reference signal is received from the active serving cell.

10. The apparatus of claim 1, wherein the first reference signal and the second reference signal are assumed to be quasi-co-located with each other.

11. The apparatus of claim 1, wherein the activation indication indicates activating multiple SCells simultaneously, the multiple SCells including a first SCell and a second SCell.

12. The apparatus of claim 11, wherein the first SCell and the second SCell are in a same frequency band, in contiguous carriers in the same frequency band, or in a frequency range.

13. The apparatus of claim 11, wherein the at least one processor is configured to activate the multiple SCells based on the one or more reference signals including the at least one temporary reference signal including an aperiodic tracking reference signal or a periodic tracking reference signal, whichever is received earliest from the multiple SCells.

14. The apparatus of claim 11, wherein the at least one processor is configured to activate the multiple SCells based on the one or more reference signals including the at least one temporary reference signal including an aperiodic tracking reference signal or a periodic tracking reference signal, whichever is received within an earliest activation time for the multiple SCells.

15. The apparatus of claim 11, wherein the at least one processor is configured to activate the multiple SCells based on the one or more reference signals including the at least one temporary reference signal including an aperiodic tracking reference signal or a periodic tracking reference signal, whichever is received latest from the multiple SCells.

16. The apparatus of claim 11, wherein at least one processor is configured to activate the SCell no later than in slot n+K, where slot n represents a slotin which the activation indication is received, and K is based on at least one of a time period between receiving the activation indication from the serving cell and transmitting an acknowledgment (ACK) of the activation indication to the serving cell, the SCell activation time between transmission of the ACK of the activation indication and a second time duration after receiving two or four reference signals including one of the first reference signal or the second reference signal, and a delay uncertainty in acquiring one or more first available CSI reporting resources.

17. An apparatus for wireless communication at a user equipment (UE), comprising:
at least one memory; and
at least one processor coupled to the at least one memory and configured to:
receive, from a serving cell, an activation indication for a secondary cell (SCell) based on a first reference signal, the activation indication indicating a transmission of the first reference signal for activating the SCell;
identify whether the first reference signal is transmitted as indicated; and
activate, upon identifying that the first reference signal is transmitted as indicated, the SCell based on one or more reference signals including the first reference signal or a second reference signal.

18. The apparatus of claim 17, wherein the at least one processor is further configured to:
transmit, to the serving cell, an acknowledgment (ACK) of receiving the activation indication, wherein the activation indication is processed within a first time duration after the ACK is transmitted to the serving cell.

19. The apparatus of claim 17, wherein the first reference signal includes at least one of a periodic tracking reference signal or an aperiodic tracking reference signal.

20. The apparatus of claim 17, wherein, to identify whether the first reference signal is transmitted as indicated, the at least one processor is configured to:
perform a clear channel assessment to determine whether a channel measurement is greater than a threshold value; and
identify that the first reference signal is not transmitted as indicated by the activation indication in response to determining that the channel measurement is greater than the threshold value.

21. The apparatus of claim 17, wherein the at least one processor is configured to:
receive, from the serving cell, an instruction to cancel the transmission of the first reference signal wherein the UE identifies that the first reference signal is not transmitted in response to receiving the instruction to cancel the first reference signal,
wherein the instruction to cancel the activation indication for the SCell based on the first reference signal is indicated by one of a medium access control (MAC) control element (CE) (MAC-CE) or downlink control information (DCI).

22. The apparatus of claim 17, wherein the at least one processor is configured to:
activate, based on the first reference signal is not transmitted as indicated, the SCell based on the second reference signal received from the SCell.

23. The apparatus of claim 22, wherein the SCell is activated no later than in slot n+K, where the activation indication is received in slot n, and K is determined based on at least one of a time period between receiving the activation indication from the serving cell transmitting an acknowledgment (ACK) of the activation indication to the serving cell, an SCell activation time between the transmission of the ACK of the activation indication and a second time duration after receiving the second reference signal, and a delay uncertainty in acquiring one or more first available CSI reporting resources.

24. The apparatus of claim 17, wherein the at least one processor is further configured to:
receive a new activation indication indicating a transmission of the second reference signal for activating the SCell,
wherein, upon receiving the new activation indication, the UE identifies that the first reference signal is not transmitted as indicated.

25. The apparatus of claim 24, wherein the at least one processor is configured to:
activate the SCell no later than in slot n+K, where slot n represents a slot in which the activation indication is received, and K is based on at least one of a time period between receiving the activation indication from the serving cell and transmitting an acknowledgment (ACK) of the activation indication to the serving cell, an SCell activation time between the transmission of the ACK of the activation indication and a second time duration after receiving the second reference signal, and a delay uncertainty in acquiring one or more first available CSI reporting resources.

26. The apparatus of claim 17, wherein the SCell comprises multiple sub-bands, and
wherein, to identify whether the first reference signal is transmitted as indicated, the at least one processor is configured to:
perform a clear channel assessment to determine whether channel measurements are greater than a threshold value for at least one of the multiple sub-bands; and
identify that the first reference signal is not transmitted as indicated upon determining that the channel measurements of at least one of the multiple sub-bands are greater than the threshold value.

27. A method of wireless communication at a user equipment (UE), comprising:
receiving, from a serving cell, an activation indication for a secondary cell (SCell);
receiving a first reference signal from the SCell, the first reference signal including at least one temporary reference signal;
identifying whether a second reference signal is received after processing the activation indication and before an expiration of an SCell activation time; and
activating, upon identifying that the second reference signal is received, the SCell based on one or more reference signals including at least one of the first reference signal or the second reference signal.

28. The method of claim 27, wherein the SCell is activated no later than in slot n+K, where the activation indication is received in slot n, and K is determined based on at least one of a time period between receiving the activation indication from the serving cell and transmitting an acknowledgment (ACK) of the activation indication to the serving cell, the SCell activation time between transmission of the ACK of the activation indication and a second time duration after receiving the at least one temporary reference signal, and a delay uncertainty in acquiring one or more first available CSI reporting resources.

29. A method of wireless communication at a user equipment (UE), comprising:
receiving, from a serving cell, an activation indication for a secondary cell (SCell) based on a first reference signal, the activation indication indicating a transmission of the first reference signal for activating the SCell;
identifying whether the first reference signal is transmitted as indicated; and
activating, upon identifying that the first reference signal is transmitted as indicated, the SCell based on one or more reference signals including the first reference signal or a second reference signal.

30. The method of claim 29, wherein the SCell is activated no later than in slot n+K, where the activation indication is received in slot n, and K is determined based on at least one of a time period between receiving the activation indication from the serving cell transmitting an acknowledgment (ACK) of the activation indication to the serving cell, an SCell activation time between the transmission of the ACK of the activation indication and a second time duration after receiving the second reference signal, and a delay uncertainty in acquiring one or more first available CSI reporting resources.

31. An apparatus for wireless communication at a user equipment (UE), comprising:
- at least one memory; and
- at least one processor coupled to the at least one memory and configured to:
  - receive, from a serving cell, an activation indication for a secondary cell (SCell);
  - receive a first reference signal from the SCell, the first reference signal including at least one channel state information (CSI) reference signal (CSI RS);
  - receive a second reference signal prior to an expiration of an SCell activation time; and
  - activate, based on the second reference signal being received after the activation indication and prior to the expiration of the SCell activation time, the SCell based on the second reference signal.

32. An apparatus for wireless communication at a user equipment (UE), comprising:
- a memory; and
- at least one processor coupled to the memory and configured to:
  - receive, from a serving cell, an activation indication for a secondary cell (SCell) based on a first reference signal, the activation indication indicating a transmission of the first reference signal for activating the SCell;
  - receive, from the serving cell, a second reference signal; and
  - activate the SCell based on one or more reference signals including the first reference signal or the second reference signal.

33. A method for wireless communication at a user equipment (UE), comprising:
- receiving, from a serving cell, an activation indication for a secondary cell (SCell);
- receiving a first reference signal from the SCell, the first reference signal including at least one channel state information (CSI) reference signal (CSI RS);
- receiving a second reference signal prior to an expiration of an SCell activation time; and
- activating, based on the second reference signal being received after the activation indication and prior to the expiration of the SCell activation time, the SCell based on the second reference signal.

34. A method for wireless communication at a user equipment (UE), comprising:
- receiving, from a serving cell, an activation indication for a secondary cell (SCell) based on a first reference signal, the activation indication indicating a transmission of the first reference signal for activating the SCell;
- receiving, from the serving cell, a second reference signal; and
- activating the SCell based on one or more reference signals including the first reference signal or the second reference signal.

* * * * *